United States Patent [19]
Komori et al.
[11] 4,088,872
[45] May 9, 1978

[54] REPEATING MECHANISM FOR A COPYING APPARATUS

[75] Inventors: Shigehiro Komori; Hisashi Sakamaki, both of Yokohama; Hiroyuki Hattori, Mitaka; Toshihide Iida, Tokyo; Koichi Miyamoto, Tokyo; Kazumi Umezawa, Yokohama, all of Japan

[73] Assignee: Canon Kabushiki Kaisha, Tokyo, Japan

[21] Appl. No.: 629,672

[22] Filed: Nov. 6, 1975

Related U.S. Application Data

[60] Division of Ser. No. 581,546, May 28, 1975, Pat. No. 4,013,359, which is a continuation of Ser. No. 413,221, Nov. 6, 1973, abandoned, which is a division of Ser. No. 258,820, Jun. 1, 1972, Pat. No. 3,804,512.

[30] Foreign Application Priority Data

| | | |
|---|---|---|
| Jun. 9, 1971 | Japan | 46-48632[U] |
| Jun. 3, 1971 | Japan | 46-38917 |
| Jun. 3, 1971 | Japan | 46-38918 |
| Jun. 10, 1971 | Japan | 46-41195 |
| Jun. 10, 1971 | Japan | 46-41196 |
| Jun. 10, 1971 | Japan | 46-41197 |

[51] Int. Cl.² ........................ G06M 3/02; G06F 15/18
[52] U.S. Cl. ............................ 235/91 R; 235/132 A; 355/14; 235/132 R
[58] Field of Search ............ 235/132 A, 132 R, 91 R; 355/14

[56] References Cited

U.S. PATENT DOCUMENTS

| | | | |
|---|---|---|---|
| 2,904,251 | 9/1959 | Hazard et al. | 235/132 A |
| 3,653,756 | 4/1972 | Mielnikowski, Jr. et al. | 355/14 |
| 3,659,084 | 4/1972 | Engel et al. | 235/132 R |
| 3,710,079 | 1/1973 | Cralle, Jr. et al. | 355/14 |
| 3,731,874 | 5/1973 | Fowlie | 235/91 R |

*Primary Examiner*—Stephen J. Tomsky
*Attorney, Agent, or Firm*—Fitzpatrick, Cella, Harper & Scinto

[57] ABSTRACT

A counting device including a click wheel operative integrally with a dial for setting the number of repetitive operations, the click wheel having teeth therearound, the number of which corresponds to the number of the repetitive operations; a ratchet wheel having a projection, the ratchet wheel being rotated to a starting position thereof by rotation of the click wheel; a feeding pawl for feeding the ratchet wheel in response to an external signal for every operation; a preventing structure for preventing the ratchet wheel from returning by pressure contact or engagement; and a start button integrally formed with a center shaft and a rotation preventing member of the center shaft, the start button being locked by the preventing structure for said ratchet wheel, and the rotation preventing member being engageable with the preventing structure; the engagement between the rotation preventing member and the preventing structure changing to open a switch as soon as the projection of the ratchet wheel releases the preventing structure; the start button closing the switch, when depressed after the ratchet wheel is reset to the starting position thereof, keeping the preventing structure in the releasing position thereof, and the starting button being kept in the depressed position and the ratchet wheel being prevented from returning by another engagement between the rotation preventing member and the preventing structure.

2 Claims, 61 Drawing Figures

REPEATING MECHANISM FOR A COPYING APPARATUS

This is a division of application Ser. No. 581,546, now U.S. Pat. No. 4,013,359, filed May 28, 1975, which is a continuation of application Ser. No. 413,221 filed Nov. 6, 1973, now abandoned, which, in turn, is a division of application Ser. No. 258,820, filed June 1, 1972, now U.S. Pat. No. 3,804,512.

BACKGROUND OF THE INVENTION

1. Field of the Invention

This invention relates to a copying apparatus for copying both sheet originals and thicker originals, and move particularly to an epoch-making copying apparatus which is capable of high-speed copy production and which incorporates various novel process means.

2. Description of the Prior Art

The conventional copying machines are generally classified into two types, one of which is only able to copy sheet originals and the other is meant to copy three-dimensional originals such as books and the like.

The copiers exclusively for use with sheet originals cannot copy books or other thicker originals but are meritorious in that sheet originals can be rapidly copied simply by feeding them into an inlet for insertion and that there is no return stroke for the original carriage or the optical system during the same process, thus enhancing the copying speed correspondingly or approximately twice. These copiers have further merits in the simplicity and low cost of the entire construction, and also in the readiness with which an automatic original supply means may be added if required.

The other type of copiers, i.e. those for copying books or thicker originals have a great characteristic that they can copy both sheet originals and thicker originals. However, their construction is such that any original to be copied must be flatly spread over the original carriage, and such constructions unavoidably leads to cumbersome procedures of raising the original keep cover cover to place each sheet original on the original carriage, closing the keep cover and depressing the copy button, as is required to copy thicker originals. Moreover, the original carriage or the optical system operatively involves its return stroke, which means a corresponding loss of time and accordingly a corresponding reduction in copying speed for the same process. Additionally, mechanisms are not only complicated and expensive but also great difficulties will be encountered in incorporating an automatic original supply means.

For these reasons, the foregoing two conventional types of copying machines have been enjoying their unique markets, respectively.

In most offices, however, demand for copies of sheet originals is greater than that for copies of thicker originals. For this reason, those offices had to resort to copying machines for thick originals which are more expensive and less convenient to copy sheet originals.

To overcome such irrationality, there have heretofore been proposed copying apparatuses which are capable of copying thicker originals while maintaining their merits as sheet original copying apparatus. Such apparatuses are grouped into the following two types:

I. The apparatus portion overlying the path of sheet originals is detachably constructed so that when copying thicker originals, such portion may be detached from the apparatus body so as to expose the sheet original transport rolls of the apparatus body. A thicker original may be manually urged against such exposed transport rolls and transported with the aid of the rubber rolls so as to be subjected to a through-slit exposure.

II. This type is substantially identical in construction with the type I except in that there is additionally provided a carrier comprising a transparent plate of glass or plastics, on which a thicker original may be placed and transported for exposure with the edges of the carrier held by two or more pairs of transport rolls.

These two types of apparatuses are substantially similar to the sheet original copying machines in construction and accordingly in cost, but suffer from some demerits as follows:

(1) From the user's point of view, removal of an apparatus portion means a considerably cumbersome procedure, and also would encounter a difficulty in providing a storage space therefor if the entire office space is limited. In case of type II, storage of the carrier would also be troublesome.

(2) In case of type I, the variable manual pressure imparted to the original may cause a great variation in the load to the drive of the apparatus body. In case of type II, the thickness of the carrier may cause a corresponding variation in the length of the optical path, which in turn would result in erroneous focusing and accordingly erroneous synchronization, thus seriously affecting the quality of the resultant copies.

(3) A gear sprocket wheel located at the end of original transport rolls for driving such rolls, and further in case of type II, carrier transport rolls, would project outwardly of the path for originals, thus preventing such path from being flat and accordingly preventing a portion of a bulky original from being copied.

(4) Where the original to be copied has a substantial thickness like books and the leading edge of the original (as viewed in the direction of movement thereof) has a complicated configuration (due to the book cover or the opened position of the book with the page margins thereof forming a slope), the position for the leading edge of the resultant copy image may be greatly variable because the leading edge of the book or like original is detected by a detector switch designed for detecting the leading edges of sheet originals.

Thus, the copying apparatuses of the types as mentioned under items I and II above are practically unsatisfactory and even their merits are merely nominal.

SUMMARY OF THE INVENTION

The present invention eliminates all the disadvantages mentioned above, and includes improvements in the various components of a copying apparatus.

An object of the present invention is to provide a copying apparatus which can fully function both as sheet original copier and thick original copier and also can increase the copying speed in accordance with the variable size of copies.

The copying apparatus of the present invention is of the type using the liquid development and image transfer system and is of such construction that sheet originals and thicker originals such as books and the like may equally be copied with ease.

Where sheet originals are to be copied by the copying apparatus of the present invention, a sheet original is inserted into the nip between sheet original transport rolls rotating in synchronism with a photosensitive drum normally rotated after a predetermined time of start preparation has passed, as will further be described. The leading edge of the sheet original is detected by detector means including a lamp and light receiving element, whereupon the transport rolls are temporarily stopped, thus stopping the original sheet. When the rotating photosensitive drum comes to a predetermined position, an original start signal is produced from the photosensitve drum to rotate the transport rolls again, so that the original is transported in synchronism with the photosensitive drum and finally discharged out of the apparatus by transport means such as rolls. During such travel, the original passes through an illuminating station. The photosensitive drum is normally rotating in one direction. The photosensitive drum passes through suitable copying processes to form a latent image thereon and reaches a developing means, which comprises a developing liquid tank, means such as pump or the like for stirring and raising developing liquid, and a developing electrode. This electrode is adapted to be urged toward the photosensitive drum by spring means with a very slight clearance maintained therebetween. The latent image formed on the photosensitive drum is developed into a visual image by toner contained in the developing liquid raised onto the developing electrode by said pump or like means. The excess developing liquid left on the photosensitive drum is removed by a post charger without disturbing the formed image. Subsequently, a transfer medium fed from paper feed means is brought into inimate contact with the surface of the photosensitive drum so that the image on the drum is transferred to the transfer medium as the latter is electrically charged. Thereafter, the transfer medium is separated from the photosensitive drum by a separator belt and directed to a drying-fixing station. Any residual developing liquid with toner remaining on the photosensitive drum is wiped off by the edge portion of a blade cleaner urged into contact with the photosensitive drum, thus making the drum ready for reuse in the next cycle. The developing liquid thus wiped off by the blade cleaner flows along grooves formed around the opposite end portions of the photosensitive drum and down into the developing means for reuse.

Where book or thicker originals (hereinafter referred to as "book originals") are to be copied, the copying apparatus is changed over from the above-described sheet original copying mode to a book original copying mode. Such mode change-over may be accomplished by depressing a change-over button to cause means such as lever and projection to release a cam on the underside of the original carriage from its sheet original copying position, thus displacing the original carriage into its book original copying position. With such movement of the original carriage from its sheet original copying position into its book original copying position, the drive and electric supply to the sheet original transport means is cut off to thereby change over the circuit into a mode for book originals. In the book original copying mode, the leading edge of a book original assumes the position which was previously occupied by the detector means in the sheet original copying mode. A book original to be copied is placed on the original carriage with the leading edges of the original and carriage registered with each other, whereafter the original is covered with an original keep cover and the copy button is depressed. As described with respect to the sheet original copying mode, a start signal is produced from the photosensitive drum to energize means such as electromagnetic plunger, thus starting to drive the original carriage reciprocally. A through-slit exposure takes place in synchronism with the peripheral speed of the photosensitive drum. After the exposure, the original carriage reverts to its return stroke in response to a signal produced from itself in accordance with the size of the original. The speed for the return stroke is higher than the speed for the forward stroke to enhance the copying speed. If multiple copies of the same book original are to be obtained continuously, the copy button is maintained depressed until a preset number of copies has been counted up by counter means for counting such number, thus providing any desired number of copies. In the other points, the operation in the book original copying mode is identical with that in the sheet original copying mode.

The start preparation preceding to the ordinary copying operation and the rest position and re-start succeeding to the completion of the copying operation will now be described briefly.

In the copying apparatus of the present invention which utilizes the liquid development system, a very small amount of toner usually tends to build up in the neighborhood of the edge portion of the blade cleaner used to clean the photosensitive drum so as to remove the residual developing liquid with toner after the image transfer. If the apparatus is stopped and left under such condition for many hours, the carrier collected at the edge portion would evaporate to solidify the toner. If the apparatus is re-started to rotate the drum under such condition, the solidified toner would injure the edge of the cleaner and/or the surface of the photosensitive drum or might adversely affect the formed image on the drum surface. For these reasons, the copying apparatus of the present invention is arranged so that closing of the main switch does not result in rotation of the drum but only allows rotation of the pump in the developing means to stir and introduce the developing liquid upwardly into a liquid supply pipe so as to pour onto the blade cleaner. After the solidified toner at and near the cleaner's edge portion is fluidized in a predetermined time, the photosensitive drum begins to rotate and the fluidized toner is wiped off.

On the other hand, if the power source should be left connected even after completion of the copying cycles, the photosensitive drum will continue its rotation and this is undesirable in respect of the service life of the drum and/or the blade cleaner. To avoid this, the copying apparatus of the present invention is also arranged so that when no further copying cycle is wanted after a previous one, the drum may be automatically stopped into a rest position irrespective of the closed position of the main switch. In such rest position, depression of the re-start switch in the operating portion will return all the apparatus parts to the position which was taken before the rest position.

BRIEF DESCRIPTION OF THE DRAWINGS

The invention will become fully apparent from the following detailed description of various embodiments thereof taken in conjunction with the accompanying drawings, in which.

DESCRIPTION OF THE PREFERRED EMBODIMENTS

The copying apparatus of the present invention is of the liquid development and transfer type which can selectively copy sheet originals such as documents and the like or thicker originals such as books and the like, as desired.

Figure 1:
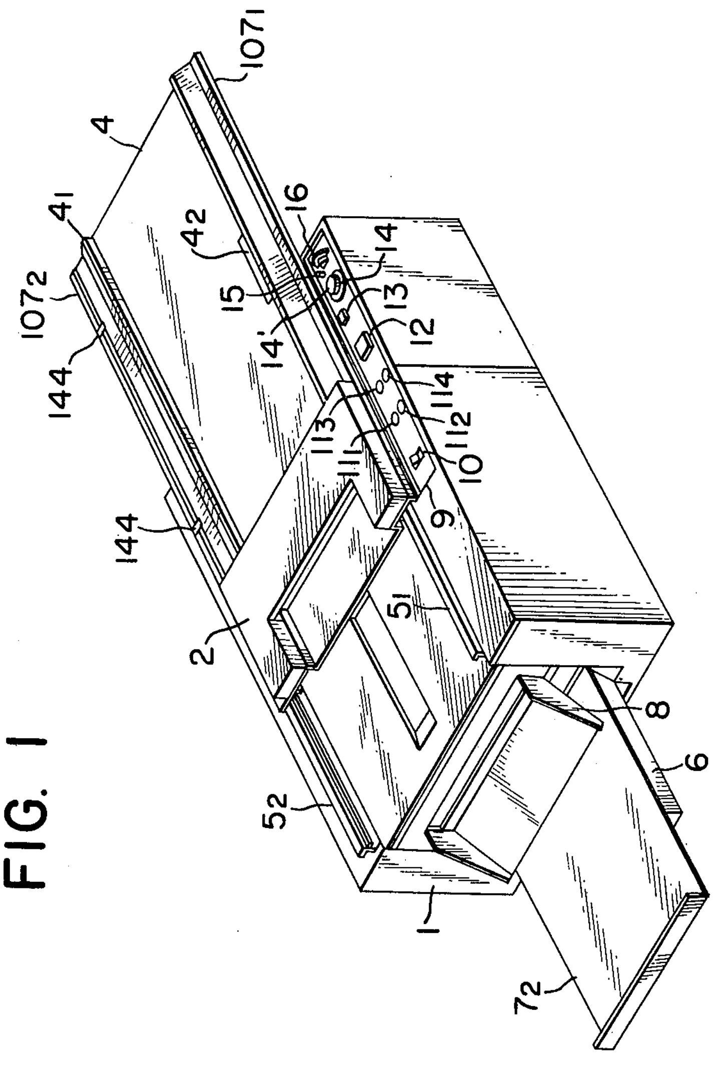
FIG. 1 is a perspective view showing an embodiment of the copying apparatus according to the present invention.

Referring to FIG. 1, an embodiment of the copying apparatus according to the present invention includes a housing 1, a sheet original transport means 2, and an original carriage 3 for supporting thereon a thick original (hereinafter referred to as "book original") and covered with an original keep cover 4. The apparatus further includes a pair of guide rails $5_1$ and $5_2$ for the original carriage, a cassette 6 containing therein a stock for transfer paper sheets P, and a lid 7 for the cassette which may also serve as a tray for receiving transfer paper sheets discharged out of the apparatus after image transfer. There are further seen an auxiliary tray 8, an operating portion 9 including a main switch 10, a group of alarm lamps $11_1$–$11_4$, a re-start lamp switch 12 which is to be further described, a button 13 for changing over the mode of operation between a mode for copying sheet originals and a mode for copying book originals, a knob and copy button 14 for selecting a mode for continuously producing multiple copies of a book original, a button 15 for urgently stopping the continuous copy mode for a book original, and a dial 16 for adjusting the density of desired copies.

Figure 2:
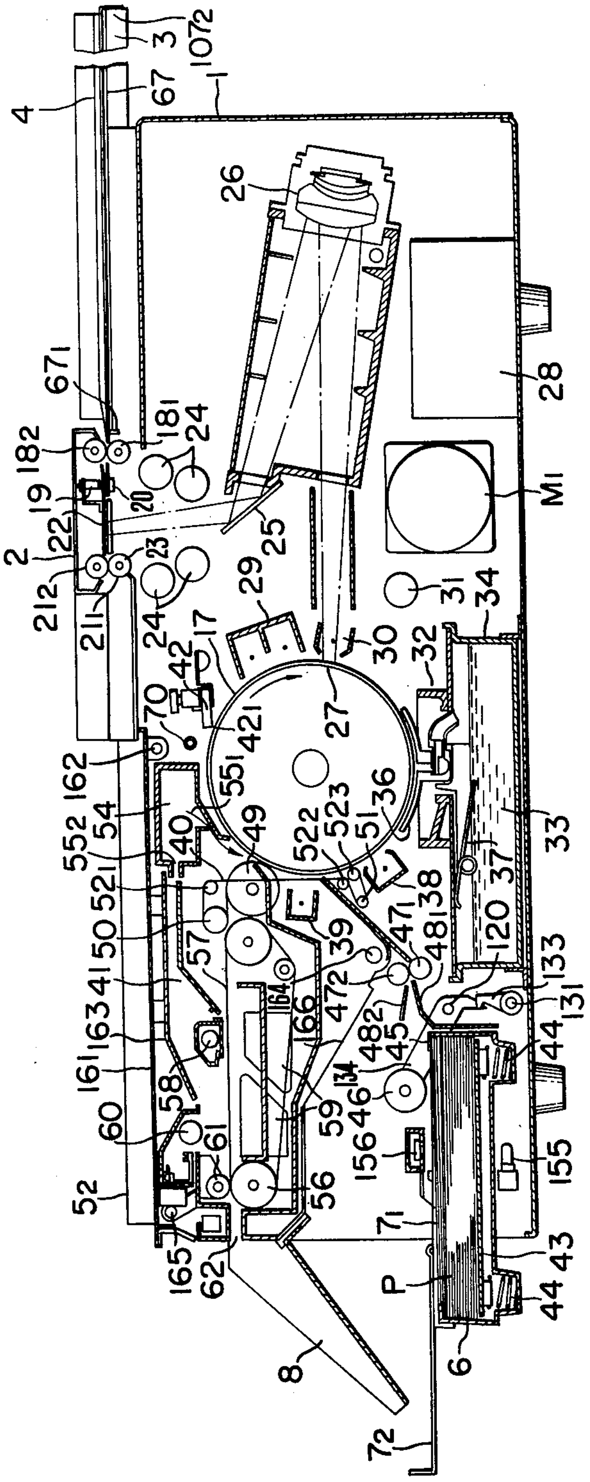
FIG. 2 is a longitudinal section thereof.

With reference to FIG. 2, the operation of such copying apparatus will first be described as to the case where sheet originals are to be copies. A sheet original is inserted from the right of the apparatus into the nip between the rolls $18_1$ and $18_2$ of the sheet original transport means 2 which are rotated in synchronism with a photosensitive drum 17 which is normally rotated after a certain time for start preparation as will be described later, and then the inserted sheet original is transported leftwardly. As soon as the leading edge of the sheet original is detected by a lamp 19 and a light receiving element 20, the rolls $18_1$ and $18_2$ are temporarily stopped from rotating, and thus the original is also stopped. Subsequently, when the photosensitive drum 17 comes to a predetermined position, a start signal for the original is produced to rotate the rolls $18_1$ and $18_2$ again so that the original is further transported leftwardly in synchronism with the rotation of the photosensitive drum 17, whereafter it is discharged upwardly by rolls $21_1$ and $21_2$. During that while, the original is illuminated from therebelow at an illuminating station 22 by four lamps 24 as it is moved on a glass plate 23. The image of the original is optically directed by a mirror 25 and a mirror lens 26 through an exposure station 27 to the surface of the photosensitive drum 17, thus forming an image thereon.

The photosensitive drum 17 comprises a photosensitive layer covered with a transparent dielectric layer and is normally rotated in clockwise direction as viewed in FIG. 2. The photosensitive drum 17 is first charged with positive polarity by a primary charger 29 supplied with a high voltage of positive polarity from a high voltage source 28. When the charged surface portion of the photosensitive drum 17 comes to the exposure station 27, the image from the illuminating station is projected on such portion of the drum 17 through a slit while it is discharged by an Ac discharger 30 supplied with a high AC voltage from the high voltage source 28. Then that surface portion of the photosensitive drum 17 is subjected to an overall exposure by a lamp 31, thus forming an electrostatic latent image on the surface portion thereof, whereafter the image carrying surface portion of the photosensitive drum 17 enters a developing means 32. The developing means 32 comprises a container 34 for containing a body of developing liquid 33, a pump 35 (FIG. 5) for stirring and raising the developing liquid, and an electrode 36 normally biased toward the photosensitive drum by a spring 37 so as to maintain a slight clearance with respect to the drum surface. The electrostatic latent image formed on the photosensitive drum 17 is developed into a visible image with the aid of toner particles contained in the developing liquid and raised onto the electrode 36 by the pump 35.

Subsequently, at a post charger 38, the image carrying surface portion of the photosensitive drum 17 is charged with a negative high voltage from the high voltage source to remove the excess liquid from the surface of the photosensitive drum 17 without disturbing the developed image thereon. Thereafter, a sheet of transfer paper P is fed from a paper feed station and brought into intimate contact with the image carrying surface of the photosensitive drum 17 so that the image on the photosensitive drum 17 is transferred onto the sheet of transfer paper P with the aid of a positive high voltage applied thereto at a transfer charger 39 from the voltage source 28. After the image transfer, the transfer paper P is separated from the photosensitive drum 17 by a separator belt 40, and then directed to a drying-fixing station 41. The photosensitive drum 17 is cleaned by the edge portion $42_1$ of a blade cleaner 42 urged into contact with the drum 17 to remove any residual amount of liquid with toner, thus becoming ready for a subsequent cycle of copying operation. The developing liquid as removed from the photosensitive drum 17 by the blade cleaner 42 flows along grooves $17_1$ formed around the opposite ends of the drum 17, and thence into the developing means 32 for reuse.

On the other hand, sheets of transfer paper P are contained in the cassette 6 which is removably mounted with a cassette rail $6_1$ fitted into a cassette receiving rail 154. Various types of cassette may be available in accordance with various sizes of transfer sheet and may be readily interchangeable as desired. The sheets of transfer paper P are supported on an inner plate 43 within the cassette 6 and the inner plate 43 is biased upwardly by a spring 44 so as to normally urge the pile of transfer paper P against separator pawls 45 formed on the forward end of the cassette at the opposite sides thereof. By suitably selecting the spring constant of the spring 44, the pressure force with which the sheets of transfer paper P are urged against the separator pawl 45 may be maintained substantially constant irrespective of the number of the transfer paper sheets P in the cassette 6.

When the photosensitive drum reaches its predetermined position, a signal is produced to lower a normally rotating paper feed roll 46 into contact with the uppermost sheet of transfer paper P so that the paper feed roll 46 cooperates with the separator pawl 45 to separate the uppermost transfer paper sheet P from the others and feed it left to right as viewed in FIG. 2. However, since register rolls $47_1$ and $47_2$ located adjacent to the cassette are stopped immediately after the feed roll 46 has been lowered, the transfer paper P fed out of the cassette 6 tends to be slack between guides $48_1$ and $48_2$ with the leading edge thereof bearing against the area of contact between the register rolls $47_1$ and $47_2$. Immediately thereafter, the photosensitive drum 17 produces a paper feed signal, in response to which the register rolls $47_1$ and $47_2$ start to rotate, thus feeding the transfer paper P at a speed equal to the peripheral speed of the photosensitive drum 17. On the other hand, the paper feed roll 46 is again raised away from the stock of transfer paper P after a predetermined time, and thereafter the separated transfer paper is continuously fed only by the register rolls $47_1$, $47_2$ and subsequent feed means.

The transfer paper separator belt 40 may be in the form of a narrow endless belt which passes from a separator roll 49 disposed in very closely spaced relationship with the photosensitive drum 17, and over a deflecting pulley 50, pulleys $52_1$, $52_2$, deflecting pulley 51, pulley $52_3$ back to the separator roll 41. The portion of the separator belt 40 extending between the pulley $52_3$ and the separator roll 49 bears against the drum 17 at a portion thereof corresponding to one end of the transfer paper sheet, and the portion of the separator belt 40 extending between the pulleys $52_1$ and $52_2$ is caused by the deflecting pulleys 50, 51 to follow a path deviated from the path of the transfer paper. The separator belt 40 is driven by the separator roll 49 at a speed substantially equal to the speed of the photosensitive drum 17. A portion of the separator belt 40 is sandwiched between one side edge of a transfer paper sheet P and the outer surface of the photosensitive drum 17 when the transfer paper P is brought into intimate contact with the photosensitive drum 17 during the image transfer process. Thus, the separation of the separator belt 40 from the photosensitive drum 17 as accomplished at the separator roll 49 will force one side edge of the transfer paper sheet P to be also separated from the photosensitive drum 17. Once its side edge is so separated, the transfer paper P may be entirely separated from the photosensitive drum 17 owing to its own self-supporting strength and to the action of the air blown from a blower 53 (FIG. 3) via a duct 54 and through an air outlet $55_1$, whereafter the transfer paper may be passed toward the drying-fixing station 41.

At the drying-fixing station 41, the unfixed transfer paper P is conveyed on a conveyor belt 57 driven by a roll 56, in the leftward direction as viewed in FIG. 2, so that the paper P is dried and fixed by the air blown from the duct 54 and intensely heated just below a heater 58. Most of the air thus heated by the heater 58 and consumed for the drying is sucked into the blower 53 (FIG. 3) through an intake port 59 disposed below the belt 57 so that such air may be circulated for reuse in the drying and fixing process. The transfer paper P thus dried and fixed may be electrically discharged by a discharger 60 so as to remove any residual charge from the surface of the paper P, whereafter it is passed via a discharge roll 61 to a discharge port 62 and discharged therethrough onto the lid 7 of the cassette 6 which also serves as a reception tray.

Figure 4:
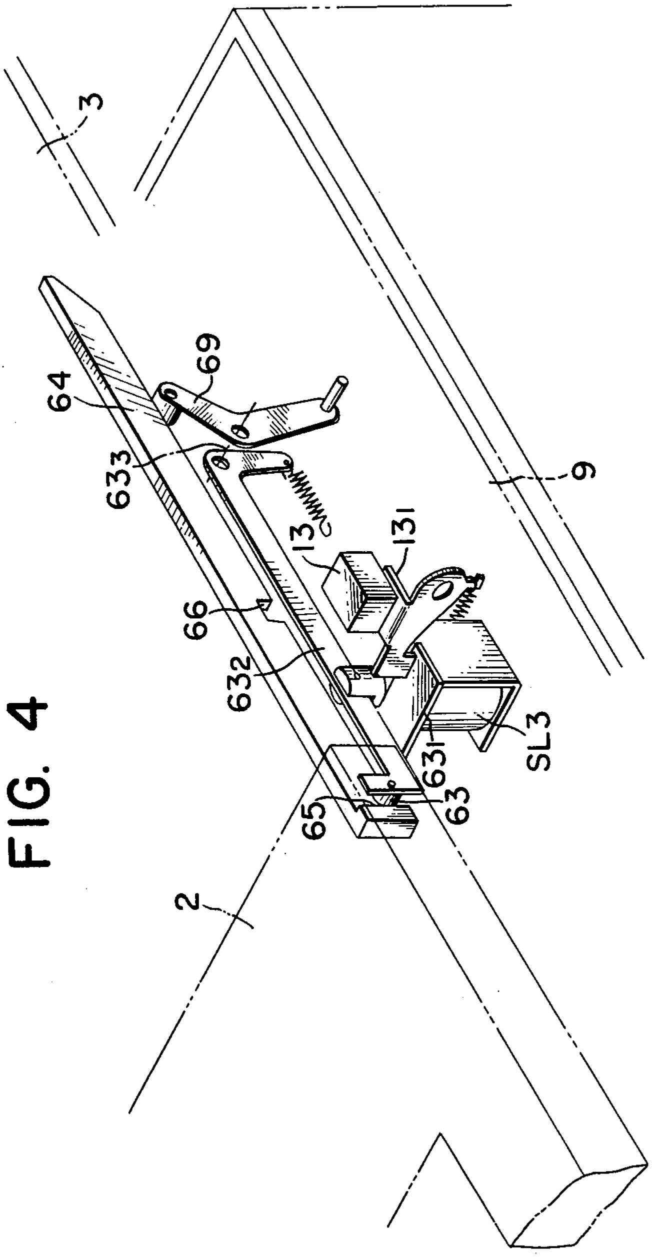
FIG. 4 is a fragmentary perspective view showing the machanism for fixing the original carriage.

With reference to FIG. 4, description will now be made of the operation of the above-described apparatus when used to copy book originals. The change-over of the operation mode from the foregoing mode for copying sheet originals to a mode for copying book originals may be accomplished in the manner described hereunder. The change-over button 13 is first depressed to cause counter-clockwise pivotal movement of a lever $63_2$ about a pin $63_3$ through the cooperation between a lever $13_1$ and a projection $63_1$ integral with the lever $63_2$, thus lowering a roll 63 to disengage this roll 63 downwardly from a sheet original positioning groove 65 formed at one end of a cam 64 mounted to the lower portion of the original carriage 3, which is thus allowed to move leftwardly as viewed in FIG. 2 until the roll 63 is received into a book original positioning groove 66. Such movement of the original carriage 3 from its position for sheet originals to its position for book originals cuts off the supply of electrical drive to the sheet original transport means 2, thereby changing over the entire circuit to the book original copying position. In this operative position, the forward end of a book original to be copied, i.e. the forward end $67_1$ of the original carriage's glass plate 67 (FIG. 2) assumes the position which was occupied by the lamp 19 and light receiving element 20 in the sheet original copying mode.

A book original to be copied is placed on the carriage's glass plate 67 with the forward end thereof registered with the forward end $67_1$ of the glass plate, and then the book original is held by the keep cover 4 (FIG. 2). Thereafter, the copy button 14' (FIG. 1) is depressed to produce an original start signal from the photosensitive drum 17 in the same way as described above with respect to the case of sheet original. This signal energizes an electromagnetic plunger SL3 so that upon disengagement of the roll 63 from the groove 66 the original carriage 3 is moved leftwardly as viewed in FIG. 2 and at the same speed as the peripheral speed of the photosensitive drum 17 to accomplish a through-slit exposure. Upon completion of such exposure, the original carriage 3 stops its leftward movement in response to its own signal corresponding to the size of the book original, whereupon the carriage 3 assumes its backward or rightward movement. The speed of this return movement is higher than the speed of the forward movement to increase the copying efficiency. Upon return of the original carriage to its initial position for the book original copying, the drive to the original carriage 3 is cut off to stop it with the roll 63 received in the groove 66.

Where multiple copies of the same book original are to be obtained continuously, this may readily be accomplished by means of counter means 14 operatively associated with the copy button 14'. The counter means 14 converts the movement of the original carriage 3 into a count through the cam 64 and crank 69 shown in FIG. 4, so as to hold the copy button 14' in depressed position until a preset number of copies has been counted up, thus enabling multiple copies to be provided.

In the other points, the operation of the apparatus for book originals is identical with that for sheet originals.

In the present embodiment of the copying apparatus, the photosensitive drum 17 can copy originals of variable width up to that of JIS (Japanese Industrial Standard) A3 format and has a circumferential length somewhat greater than the length of the A3 format. Therefore, where the originals to be copied are sheet originals, one of sheet originals of A3 format may be fed for copying per full rotation of the photosensitive drum or two of sheet originals of A4 format may be fed at a time in a direction perpendicular to the longitudinal axis thereof. If book originals are to be copied, the forward stroke (exposure stroke) of the original carriage 3 is followed by the return stroke which requires substantially as much time as the forward stroke, and thus the length of time required for providing one copy of a book original will be approximately twice the time required for one copy of a sheet original. More specifically, for originals of A3 format, one copy may be provided every two full rotations of the photosensitive drum, and for originals of A4 format, one copy may be provided per full rotation of the photosensitive drum.

Such cycle difference arising from the different sizes of paper may be detected by a signal from the cassette 6, and the cycle difference arising from the diffferent types of original may be detected by a signal resulting from the change in position of the original carriage.

Description will now be made of the start preparation preceding to an ordinary copying cycle and of the rest position and restart succeeding to the completion of one copying cycle. As has been described above, the copying apparatus of the present embodiment is of the liquid development type whereby toner particles in the developing liquid are fixed by evaporation and desiccation of carrier liquid. Also, the blade cleaner 42, which may be formed of elastomer such as urethane rubber, nitride rubber, fluorine rubber, polysulfide rubber, acrylic rubber or the like and which is used to clean the photosensitive drum 17 to remove the toner or developing liquid remaining thereon after the image transfer, usually tends to permit a very small amount of toner to build up in the neighborhood of the cleaner's edge portion $42_1$. If the apparatus is stopped and left under such condition for many hours, the carrier collected at the edge portion $42_1$ would evaporate to solidify the toner. If the apparatus is re-started to rotate the drum 17 under such condition, the solidified toner would injure the edge $42_1$ of the cleaner 42 and/or the surface of the photosensitive drum 17 or might adversely affect the formed image on the drum surface. For these reasons, the copying apparatus of the present embodiment is arranged so that closing of the main switch 10 does not result in rotation of the drum 17 but only allows rotation of the pump in the developing means 32 (FIG. 5) to stir and introduce the developing liquid 33 upwardly into a liquid supply pipe 70 (FIG. 2) so as to pour onto the blade cleaner 42. After the solidified toner at and near the cleaner's edge portion $42_1$ is fluidized in a predetermined time, the photosensitive drum 17 begins to rotate and the fluidized toner is wiped off. After the photosensitive drum 17 has made at least one-half rotation, the rolls $18_1$ and $18_2$ of the sheet original transport means 2 begin to rotate and enable a copying cycle to take place.

On the other hand, if the power source should be left connected even after completion of the copying cycles, the photosensitive drum 17 will continue its rotation and this is not desirable in respect of the service life of the drum 17 and/or the blade cleaner 42. To avoid this, the copying apparatus of the present embodiment is also arranged so that when no further copying cycle is wanted after a previous one, the drum 17 may be automatically stopped into a rest position irrespective of "ON" position of the main switch 10. The time allowed for such rest position is selected to a value longer than the time required for a sheet of transfer paper P with a copy image thereon to be discharged out of the apparatus and for the entire surface of the photosensitive drum 17 to be cleaned up. In such rest position, depression of the re-start switch 12 in the operating portion 9 will return all the apparatus parts to the position which was taken before the rest position.

In an electrophotographic copying apparatus using the drum type image transfer system, various process elements are disposed around the entire periphery of a photosensitive drum. On the other hand, the photosensitive drum and the surrounding process elements must permit ready removal and inspection thereof for the purpose of maintenance. Further, the photosensitive drum should desirably incorporate therein a temperature control mechanism for preventing formation of dews on the surface of the drum.

The present invention also intends to satisfy such requirements and provide a photosensitive drum supporting means which is simple to construct and handle and compact in structure.

There are known two types of the photosensitive drum supporting means. One of them is of such a construction that the opposite ends of the drum shaft are supported by bearing frame plates which may be inserted downwardly into the housing of the copying apparatus. With such construction, however, the removal of the photosensitive drum which is sometimes required as mentioned above has involved nearly as much work as required in the complete disassemblage of the apparatus, and in addition, the size of the apparatus has become so large and hence expensive that the process elements cannot be disposed above the drum.

In view of these disadvantages, there has heretofore been proposed a support means of the type in which one end of the drum shaft is supported in a cantilever fashion by the frame of the machine housing and the drum shaft is driven to rotate so as to permit the drum to be removably mounted on the shaft. This latter type has considerably eliminated the disadvantages peculiar to the former type, but it still suffers from a demerit that the rotatable shaft supported in the cantilever fashion leads to an increased size of the supporting portion which is unsuitable for making the apparatus compact. Moreover, both the two types would encounter difficulties in mounting a temperature control mechanism.

Figure 9:
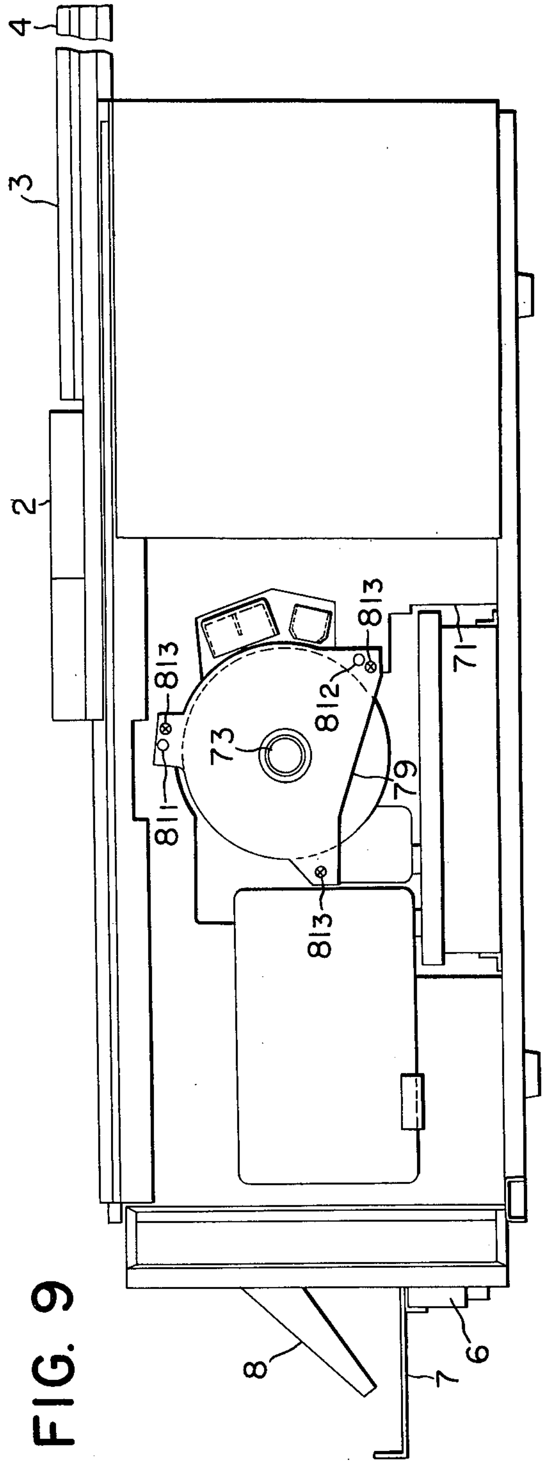
FIG. 9 is a front side view of the same apparatus with the front side cover removed therefrom.

The photosensitive drum supporting means of the present invention overcomes these problems. An embodiment thereof is shown in FIGS. 5 and 9, where an arch-shaped front frame 71 (see FIG. 9) and a rear frame 72 formed of alloy casting are secured to the bottom plate 74 of the copying apparatus body, the rear frame 72 having a drum shaft 73 securely inserted into the boss $72_1$ thereof.

The drum unit includes a drum 17 which comprises a cylindrical metal member, a photosensitive layer formed over the outer peripheral surface of the cylindrical member, and if required, a transparent resin film of high resistance covering the surface of the photosensitive layer. The photosensitive drum 17 is held by and between front and rear flanges $84_1$ and $84_2$, whose integral bearing portions $84_3$ and $84_4$ are connected together preferably by three rods 86. A pipe 85 extends between the bearing portions $84_3$ and $84_4$. A bearing $76_2$ is held by the bearing portion $84_3$. All these members together constitute the drum unit.

Figure 5:
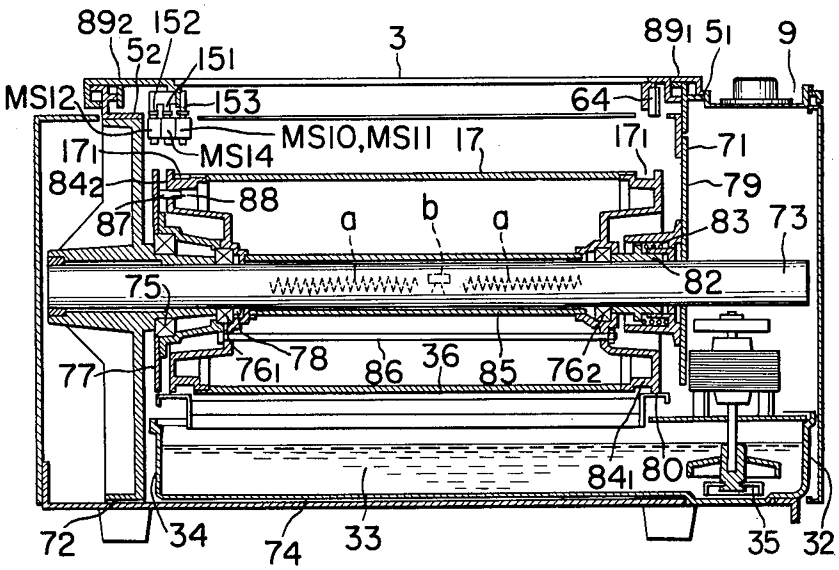
FIG. 5 is a transverse section of the same apparatus.

An axially movable thrust keep member 82 is provided to push the bearing $76_2$ leftwardly as viewed in FIG. 5. The keep member 82 has a support fitting 80 fitted outwardly thereof. A coil spring 83 is compressively mounted between the keep plate 82 and the support fitting 80. The support fitting 80 is mounted on a support plate 79. These members together constitute a front support mechanism.

Bearings 75 and $76_1$ are dounted on the boss $72_1$ of the rear frame 72 and held by a bearing box $75_1$. An anti-slip member 78 is provided for a bearing $76_1$ secured to a fixed shaft 73 by means of screws. A drum gear 77 is secured to the bearing box $75_1$ and has a clutch pin 87.

The assemblage may be accomplished in the manner described hereunder. The front lid $1_1$ of the apparatus housing is opened, whereafter the drum unit is inserted over the shaft 73 through the arch-shaped space of the front frame 71 with the bearing portion $84_4$ and pipe 85 as the guide, so that the clutch hole 88 in the flange $84_2$ is engaged by the clutch pin 87, thus coupling the unit to the drum gear 77. In the manner as shown in FIG. 9, a mounting projection of the support plate 79 of the front support mechanism is brought into abutment with the complementary portion of the front frame 71, and then the support plate 79 is positioned in place by positioning pins $81_1$ and $81_2$ and finally fastened by a screw $81_3$, thus completing the assemblage. The drum 17 is now ready to be driven from a motor through the gear 77.

The removal of the drum unit from the shaft 73 may be accomplished by reversing the above-described sequence of procedures. During the course of assemblage, the coil spring 83 biases the drum unit toward the rear frame 72 via keep member 82, bearing $76_2$, bearing portion $84_3$ and front flange $84_1$ to thereby prevent any relative play between the parts. The spring 83 will also absorb the vibrations or shocks which would occur during the transportation of the assembly.

It will thus be noted that the photosensitive drum supporting means of the present invention has the following various advantages.

(1) The use of a cantilever-fashioned shaft for the mounting and dismounting of the drum unit permits a compact design of the entire apparatus.

(2) The drum unit which is axially movable for mounting and dismounting thereof permits all process elements to be disposed around the entire periphery of the drum and provides an excellent service effect.

(3) The drum shaft secured to the apparatus body readily enables incorporation of a heater (a) and a temperature detector (b) and thus readily permits the provision of a control mechanism for stabilizing the copying process.

(4) The fact that the rear bearing for the drum unit is attached to the fixed shaft permits the drum unit to be readily mounted and dismounted.

Figure 6:
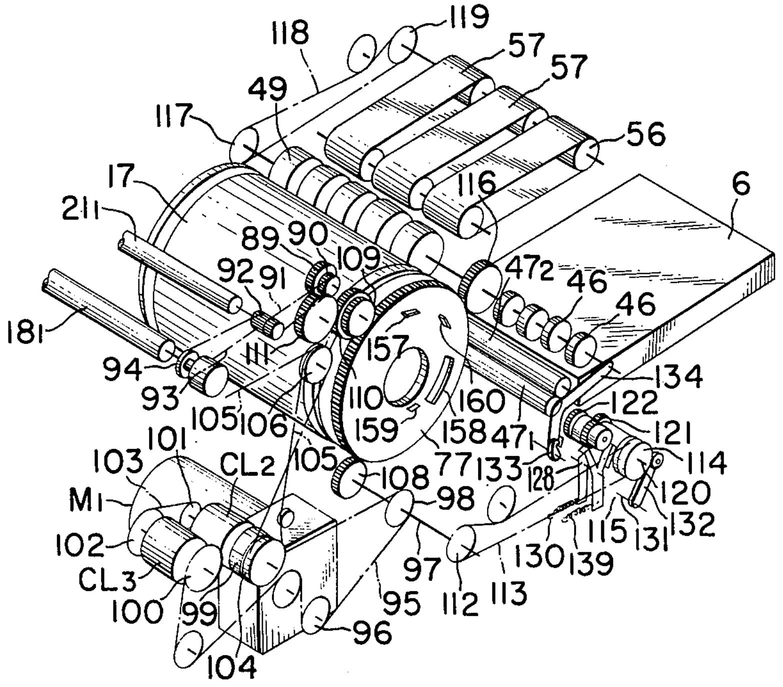
FIG. 6 is a perspective view for illustrating the drive system.

As shown in FIG. 6, the drum gear 77 is provided with a cam 157 adapted to actuate switches MS1 and MS4 to produce an original start signal, a cam 158 adapted to actuated switches MS2 and MS5 to produce a paper feed and register signal, a cam 159 adapted to actuate switches MS81 and MS82 to produce a jam detecting signal, and a cam 160 adapted to actuate a switch MS7 to produce a drum stop signal. The cam 160 is meant to predetermine the rest position for the drum and the portion of the drum which is to be stained with the cleaning blade during its rest position. The present embodiment is so designed that such stained portion of the drum may not be used as an image forming area.

Front and rear rails $5_1$ and $5_2$ are fixed to the upper ends of the frames 71 and 72 so as to slidably support the original carriage 3 by means of rollers to be described.

Figure 3:
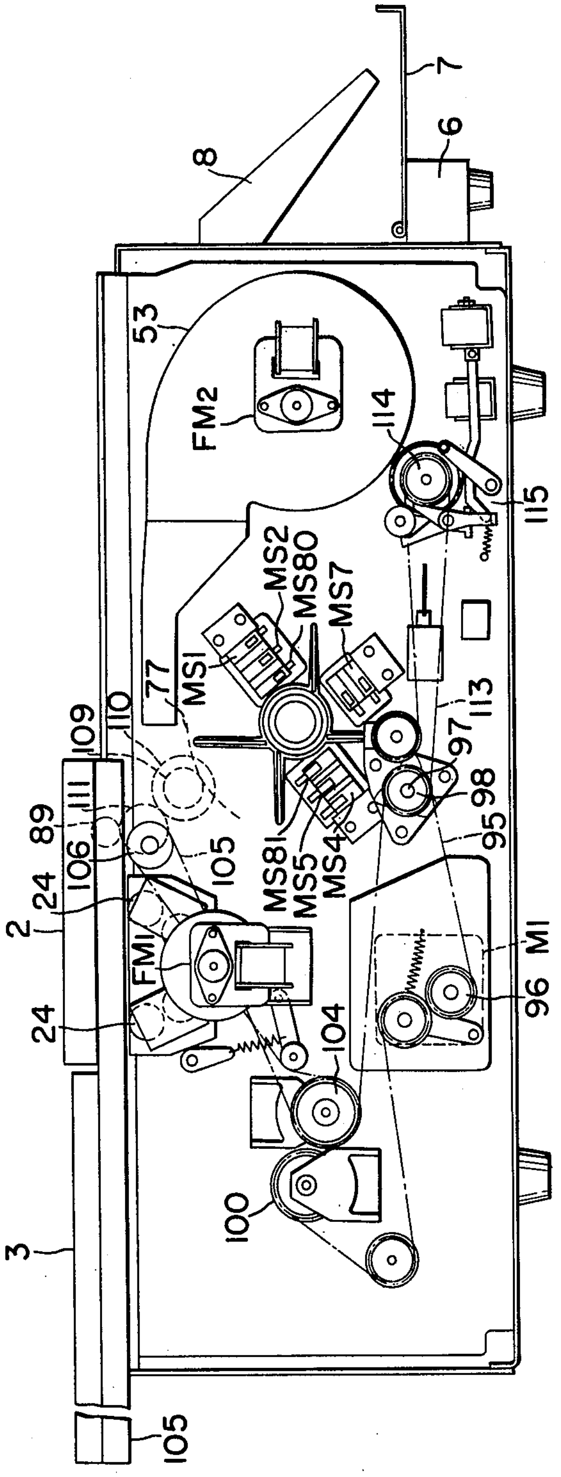
FIG. 3 is a rear side view of the FIG. 2 apparatus with the rear side cover removed therefrom.

The original carriage 3 comprises a portion for copying book originals and a sheet original transport portion 2. The sheet original transport portion 2 has a gear 89 at one end thereof as seen in FIG. 3, and this gear is driven from a drive source in the apparatus body.

Figure 7:
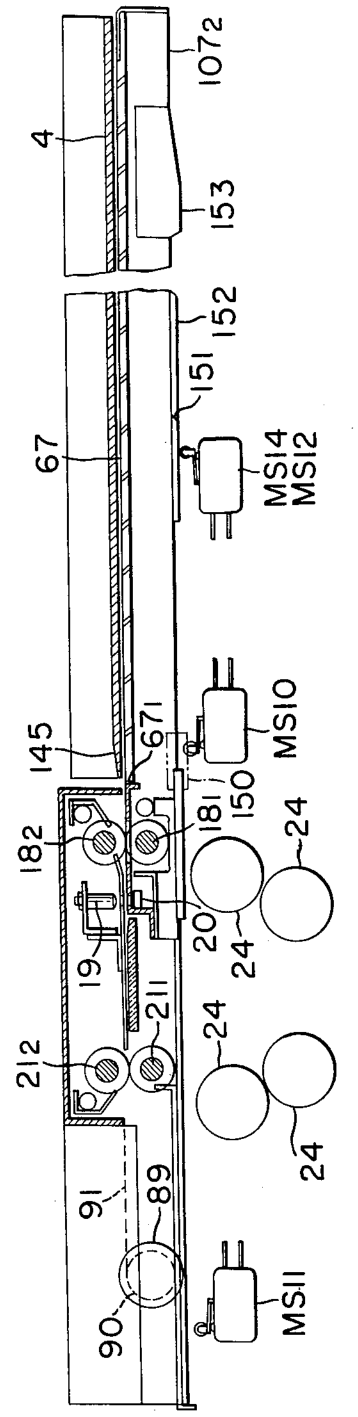
FIG. 7 is a longitudinal section of the original carriage.
Figure 8:
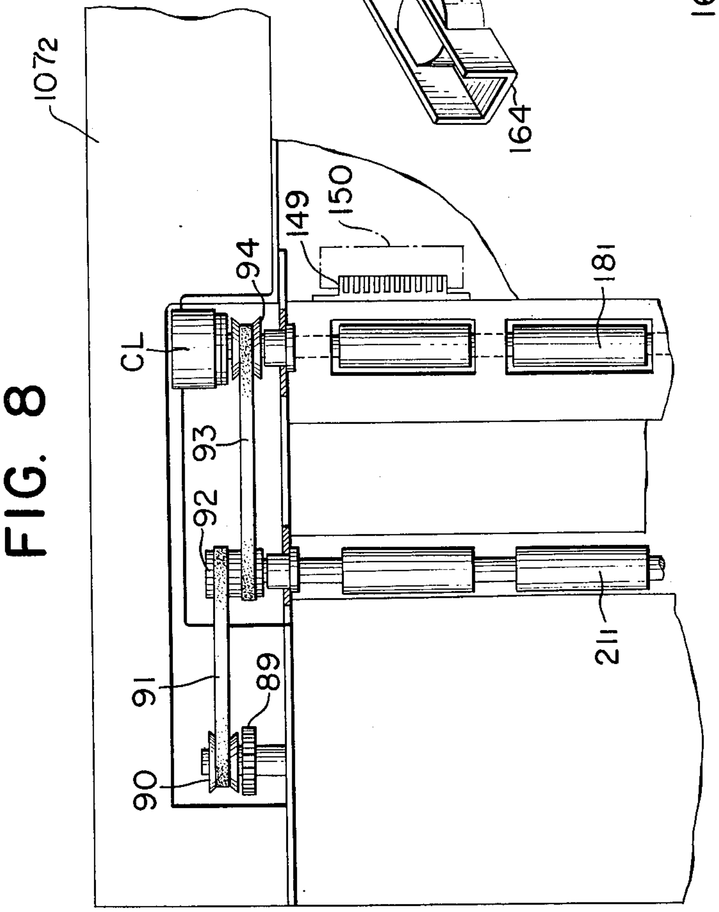
FIG. 8 is a fragmentary top plan view of the original carriage.

Referring to FIGS. 7 and 8, the drive received by the gear 89 may be transmitted through a synchro-pulley 90 coaxial with the gear 89, a synchro-belt 91 and a synchro-pulley 92 to a roll $21_1$, and at the same time transmitted through a synchro-pulley 93 to a synchro-pulley 94, from which the drive is transmitted to a roll $18_1$ under the control of clutch CL1.

The operative connection will now be described with reference to FIGS. 3 and 6. The drive from main motor M1 is transmitted via sprocket wheel 96, chain 95, sprocket wheel 98 to drive a relay shaft 97. The chain 95 also drives sprocket wheels 99 and 100 rotatably mounted on the shafts of electromagnetic clutches CL2 and CL3. Behind the clutches CL2 and CL3, sprocket wheels 101 and 102 different in number of teeth are secured to the shafts of these clutches, and these two sprockets wheels are connected together by a chain 103. Attached to the other end of the clutch CL2 is a drum 104 on which is wound a wire 105 in several turns. The wire 105 is guided therefrom in a cross fashion to pass around a pulley 106, and has the opposite ends thereof secured to the opposite ends of an angle $107_2$ (FIG. 1) forming a part of the original carriage 3. The original carriage may be reciprocated by changing over the two clutches CL2 and CL3 to rotate the drum 104 in normal and reverse directions.

One end of the relay shaft 97 carries a gear 108 which is in meshing engagement with the aforesaid drum gear 77, so as to transmit the drive from the motor to the drum gear. Between the drum gear 77 and the gear 89 of the original carriage is a relay gear train 109–111 for transmission of the drive. Where a sheet original is to be copied, the gears 89 and 111 are in engagement as shown, but where a book original is to be copied, the original carriage is shifted to break such engagement. Another gear 116 is in meshing engagement with the drum gear 77 to drive the separator roll 49, which in turn drives conveyor belt 57 via sprocket wheel 117, chain 118, sprocket wheel 119 and drive roll 56.

The other end of the relay shaft 97 carries thereon a sprocket wheel 112 for transmitting the drive via chain 113 and sprocket wheel 114 to paper feed control means 115.

By the paper feed control means designated at 115 in FIG. 6, the paper feed roll 46 (FIG. 2) will be lowered to begin feeding paper in response to a paper feed signal. After a preceding sheet of transfer paper has passed the register roll $47_1$, this roll will be temporally stopped. Subsequently, the leading edge of a subsequent sheet of transfer paper now being fed will strike the roll $47_1$ to form a loop. When the paper feed signal disappears, the register roll $47_1$ will resume its rotation to start the transfer paper and the paper feed roll 46 will rise to its initial position. These operations are all controlled electrically and mechanically.

In copying apparatuses of the type having a reciprocating original carriage, there may occur to mind the following two types of means for supporting and guiding the original carriage.

Figure 18:
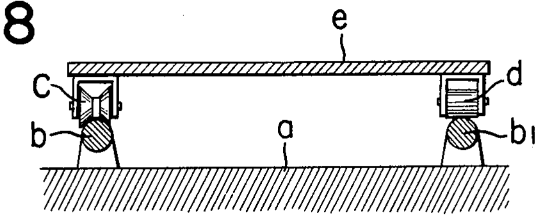
FIGS. 18 and 19 are transverse sections of the guide means for reciprocal movement of the conventional original carriage means.

1) As shown in FIG. 18, a pair of rails *b*, $b_1$ such as round rods are provided to an apparatus body *a* so that one rail *b* carries thereon a V-shaped roll *c* and the other rail $b_1$ carries thereon a flat roller *d*, rollers *c* and *d* being secured to an original carriage *e*. This construction may be the most reasonable and ideal one with the only exception that the pair of rails *b*, $b_1$ must be long enough to extend over the entire range of reciprocal travel for the carriage *e*, thus putting a great limitation in realizing a compact design of the apparatus.

Figure 19:
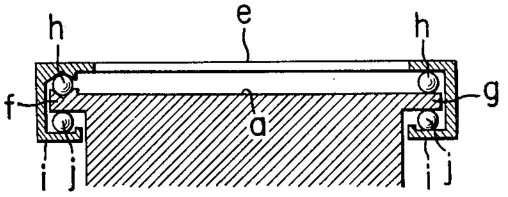

2) As shown in FIG. 19, a V-shaped rail *f* and a flat rail *g* which are both substantially as long as an original carriage *e* are provided on top of the apparatus body *a*, and the original carriage provided with rails *i*, *i* is disposed on the rails *f* and *g* with retainer-held steel balls *h* interposed therebetween. In this case, the original carriage *e*, when moved, will be projected beyond the rails *f*, *g* of the apparatus body. Therefore, a design must be made so that the rails of the apparatus body are backed up by steel balls *j* interposed between rails *f*, *g* and rails *i*, *i*. This construction may be ideally excellent, but chattering could occur between various parts or unsmooth sliding motion would be experienced if the rails and balls lack very strict dimensional precision. This would mean great difficulties in the manufacture, and a greater cost will be unavoidable because a sufficient strength or hardness is required for the steel balls and rails which are brought into point-contact.

The present invention has improved the form as shown in item (2) above to eliminate the demerits thereof while leaving the merits thereof.

Figure 10:
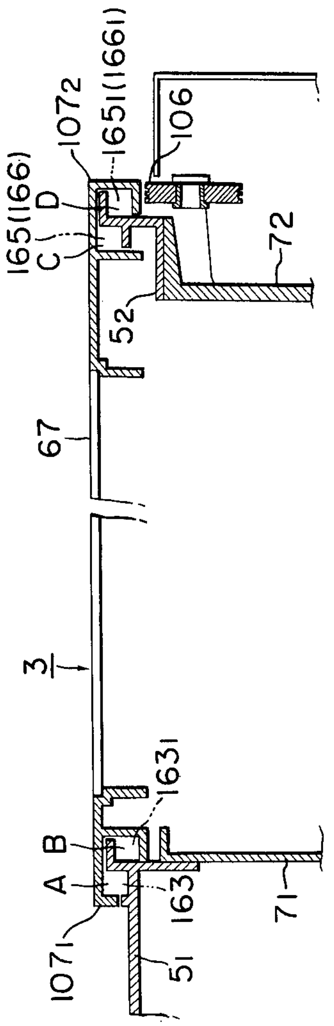
FIG. 10 is a fragmentary transverse section of the original carriage guide.
Figure 12:
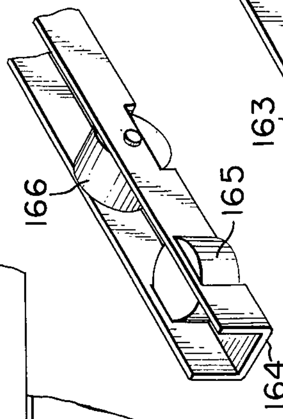
FIGS. 11 and 12 are perspective views showing guide rolls for the original carriage.

FIG. 10 shows an embodiment of the means for supporting and guiding the original carriage according to the present invention. Front and rear frames of the copying apparatus are designated by numerals 71 and 72, respectively. The original carriage 3 including a glass plate 67 may be guided by original carriage guide rails $5_1$ and $5_2$ secured to the frames 71 and 72. The original carriage 3 further includes front and rear angles $107_1$ and $107_2$. Spaces A–D are defined between the rails and the angles. A pulley 106 has a wire wound thereon for reciprocally driving the original carriage 3.

Figure 11:
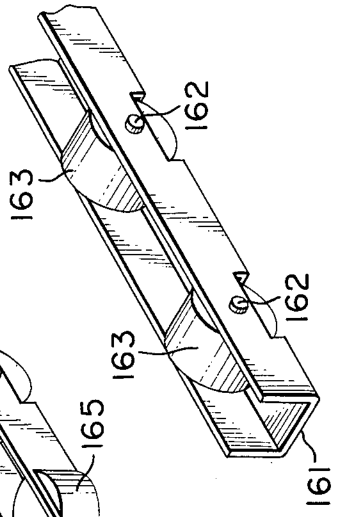

Within the spaces A and B there are disposed a number of horizontal rollers 163 journalled to a retainer 161 by means of horizontal shafts 162, in the manner as shown in FIG. 11. The rollers 163 in the space A are formed of a material of relatively high rigidity such as polycarbonate or the like, and determines the level of the original carriage 3 with respect to the rail $5_1$. The rollers $163_1$ in the space B are formed of a material having a certain degree of resiliency such as hard rubber, and are dimensioned somewhat larger than the height of the space B so as to prevent any rattling of the carriage 3 in the vertical direction.

In the other spaces C and D there are received a number of vertical rollers 165 and horizontal rollers 166 journalled to a retainer 164. The rollers 165 and 166 in the space C are formed of a material of high rigidity and determines the vertical and horizontal positions of the original carriage 3. The rollers $165_1$ and $166_1$ in the space D are formed of a resilient material and dimensioned somewhat larger than the vertical and horizontal dimensions of the space D so as to prevent rattling of the carriage in both of these directions.

Figure 21:
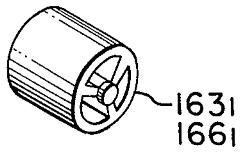
FIGS. 21 to 22 are perspective views of rollers for such guide means.
Figure 22:
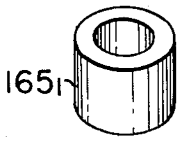
Figure 17:
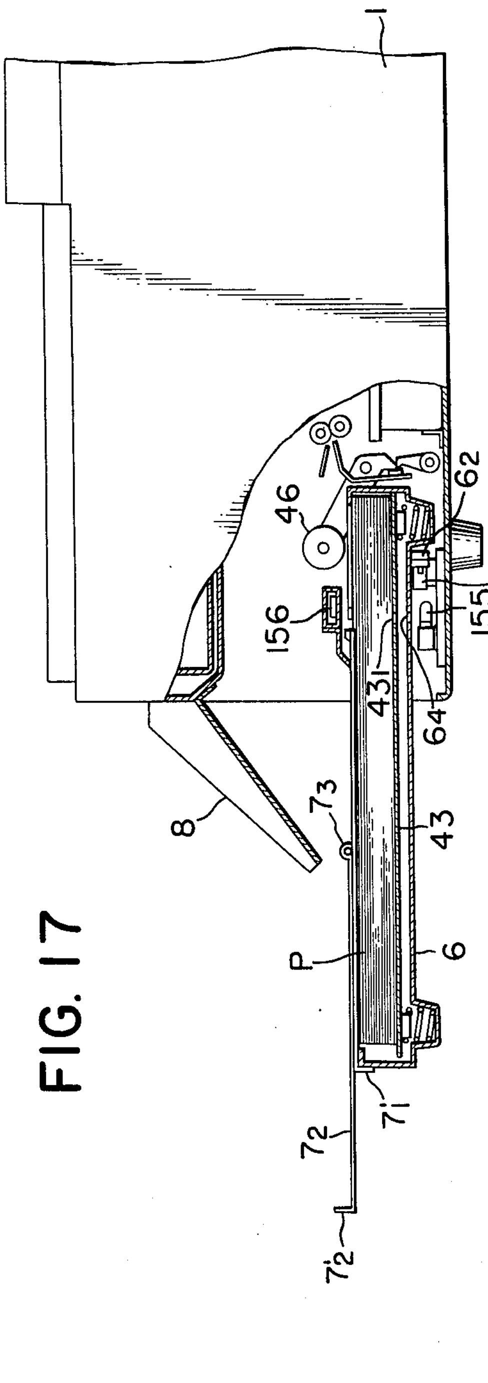

The resilient rollers $163_1$, $165_1$ and $166_1$ are so shaped as shown in FIG. 21 or 22. In case of the hollow shape as shown in FIG. 22, these rollers may be formed of the same material as that forming the rollers 163, 165 and 166 of higher rigidity. For this purpose, a material having a high surface hardness and a good wear resistance may be selected and the use of such material will lead to the economy of the material used.

Accordng to this embodiment, as will be appreciated from the foregoing, there is provided a reciprocating guide means comprising fixed rails $5_1$, $5_2$ and movable rails $107_1$, $107_2$ provided vertically opposed relationship forwardly and outwardly of the apparatus housing and reciprocable carriage 3 so as to define two sets of horizontally adjacent separate spaces A, B and C, D between the upper and lower rails. One of the two sets of spaces C and D accommodates therein horizontal rollers 165 and vertical rollers 166 restrained in the freedom of vertical and hoizontal movement by a retainer, and the other set of spaces A and B accommodates therein horizontal rollers 163 restrained in the freedom of vertical movement, thus providing guide mechanisms. The rollers in at least one of the front and rear sets of guide mechanisms are resilient rollers dimensioned slightly larger than the dimensions of the spaces in which these rollers are accommodated, so as to compensate for any possible manufacturing error of the members forming the guide. Thus, the rollers and rails are in line-contact with one another and require no particular strength or hardness. For example, the rollers may be formed of plastics and the rails may be formed of aluminum alloy extrudate. Also, the resilient rollers can absorb any manufacturing error and this leads to the provision of a rattle-free smooth reciprocating mechanism without needing high precision. Moreover, the harder rollers 163, 165 and 166, even if dimensioned slightly larger than the dimensions of the spaces therefor, have some degree of resiliency and can accommodate to the spaces to such an extent that no practical inconvenience occurs, thereby presenting a high degree of precision.

Figure 24:
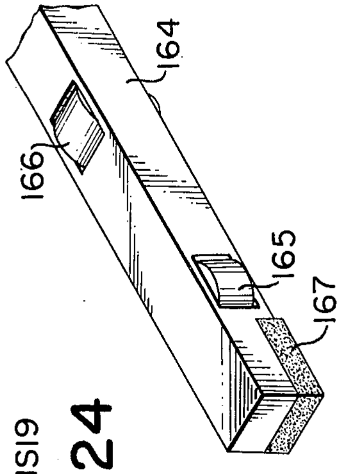
FIGS. 23 and 24 are perspective views showing further embodiments of rollers with retainers.
Figure 23:
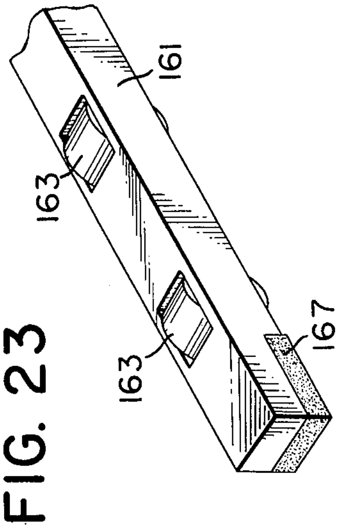
Figure 20:
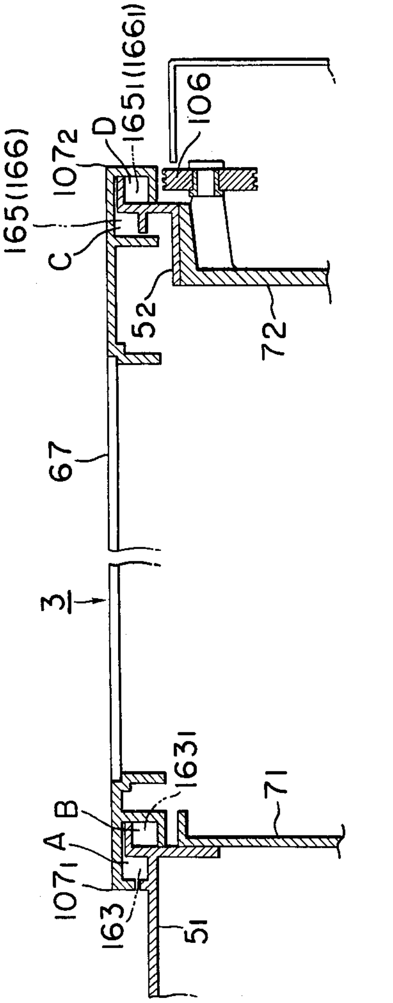
FIG. 20 is a transverse section showing an embodiment of the guide means according to the present invention.
Figure 25:
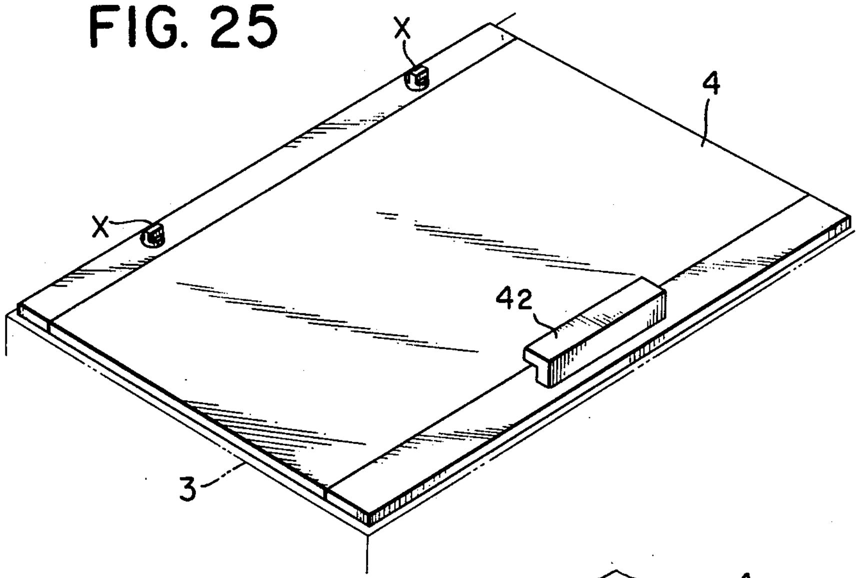
FIG. 25 is a perspective view showing the original keep cover of the present invention as applied to the original carriage in the conventional manner.
Figure 26:
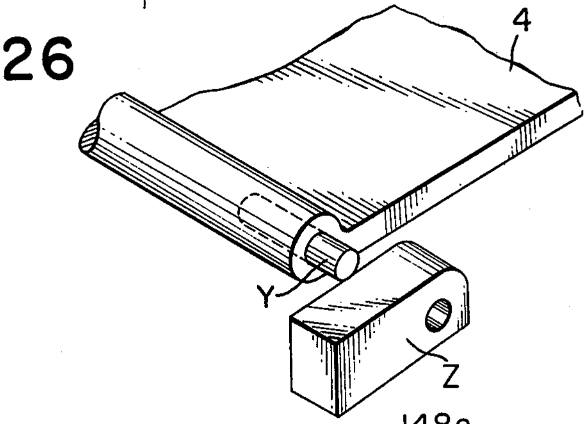
FIG. 26 is a fragmentary view showing the essential part of the original keep cover as applied to the original carriage in a different manner.
Figure 27:
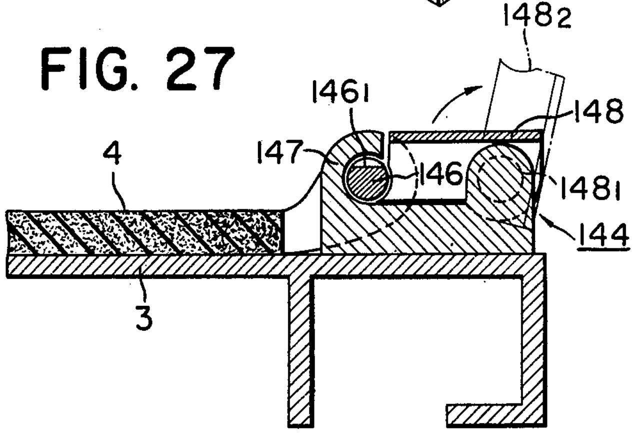
FIG. 27 illustrates an embodiment of the hinge of the original keep cover according to the present invention.

Further forms of the retainer are shown in FIGS. 23 and 24. In FIG. 23, the retainer 161 holds a number of horizontal cylindrical rollers 163 in rectangular slots formed therein, and such rollers are disposed in the aforesaid spaces A and B. In FIG. 24, the retainer 164 holds a number of vertical and horizontal cylindrical rollers 165 and 166 in rectangular slots, and these rollers are disposed in the aforesaid spaces C and D. The opposite ends of the retainer 161 or 164 are provided with dust-proof means 167 formed of felt or lke material so as to prevent entry of foreign particles into the roller portions within the rails.

Thus, the cylindrical rollers disposed in separate cubic spaces make line-contact with the rails, which means so low a contact pressure therebetween that the rollers can be readily formed of economical synthetic resin.

Figure 13:
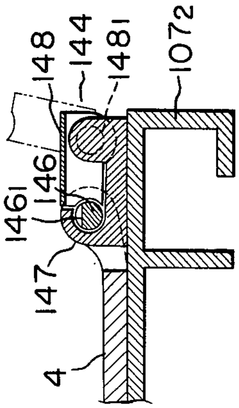
FIG. 13 is a fragmentary sectional view showing the hinged portion of the original keep cover.
Figure 14:
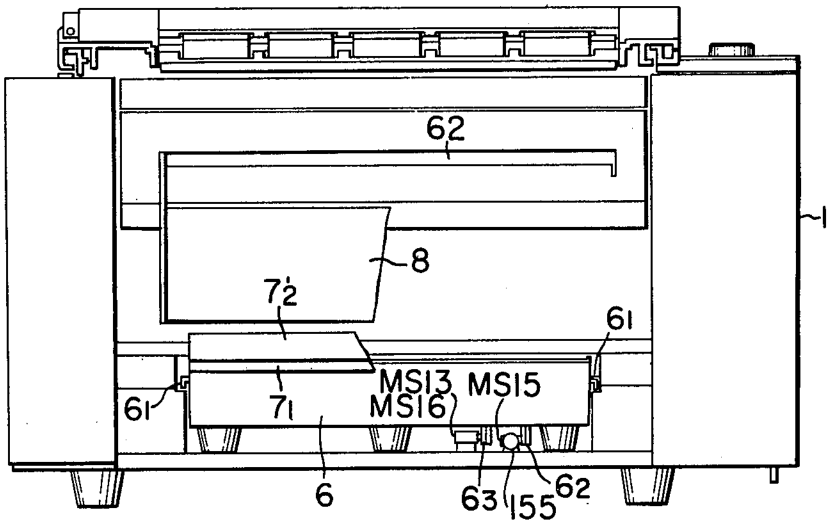
FIG. 14 is a left end view of the FIG. 1 apparatus.
Figure 15:
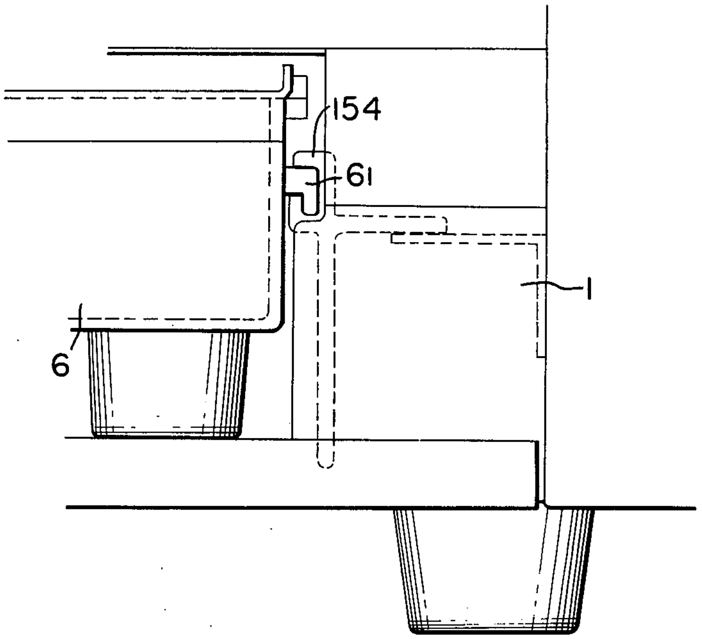
FIG. 15 is an enlarged detail of FIG. 14.
Figure 16:
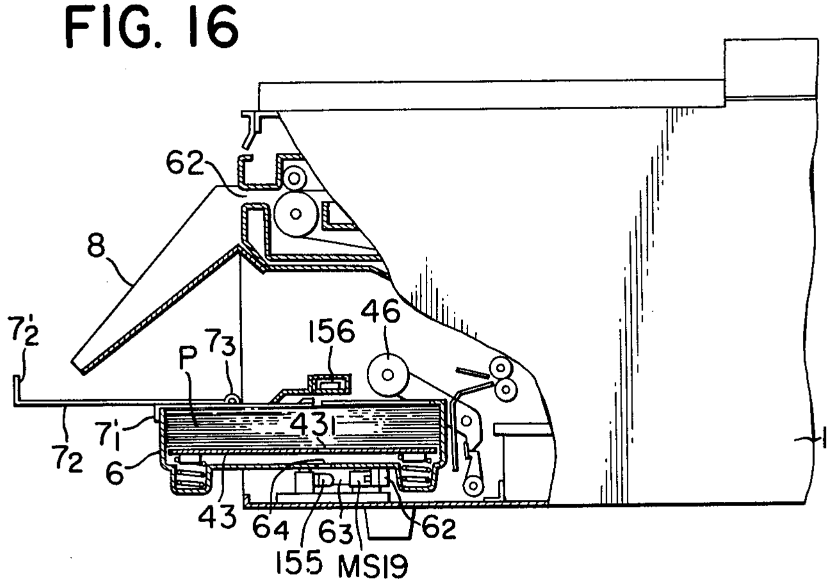
FIGS. 16 and 17 are fragmentary views, partly in cross section, of the apparatus as loaded with cassettes of different sizes.

The original keep cover 4 is formed of rubber or like material and mounted by means of hinge 144. A guide $4_1$ (FIG. 1) for facilitating the insertion of a sheet original and a cover handle $4_2$ for facilitating placement of a book original are formed on the upper surface of the keep cover 4 integrally therewith. The side edge portion of the keep cover 4 which is adjacent to the entrance for sheet originals provides a sloped portion 145 (FIG. 7) so as to facilitate the insertion of sheet originals. In order to enable the cover to be readily detached and re-mounted when a bulky book original is to be copied, the hinge 144 of the original keep cover is constructed in the manner to be described below. As shown in FIG. 13, the hinge 144 comprises a hinge pin 146 cut away as at $146_1$, a bearing member 147 for holding the pin 146 along substantially one half of the periphery thereof, and a cockable bearing member 148 for holding the remaining portion of the pin 146. Normally, the bearing members 147 and 148 embrace the hinge pin 146 to thereby restrain the pin 146 with respect to the member 148. By rotating the hinge pin 146 for a certain angle until the cut-away portion 146 thereof faces the concave arcuate surface $148_2$ of the bearing member 148, the bearing member 148 may be free to be cocked up for disengagement from the bearing member 147.

Figure 28:
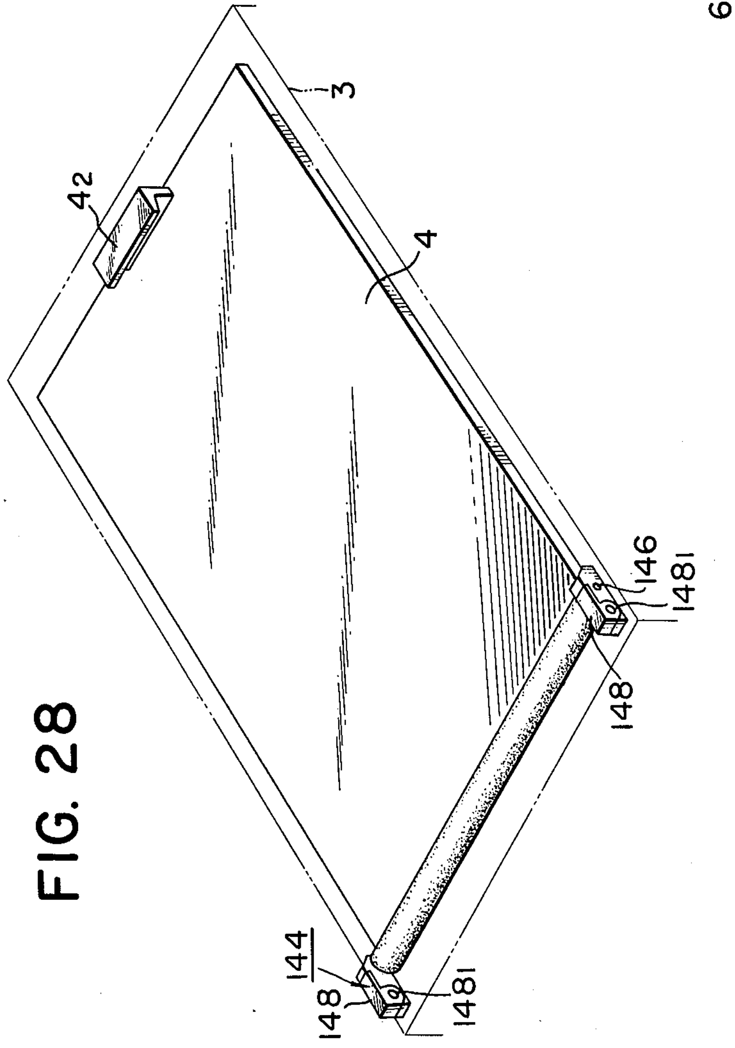
FIG. 28 is a perspective view of the original keep cover as attached to the original carriage by means of the hinge shown in FIG. 27.
Figure 29:
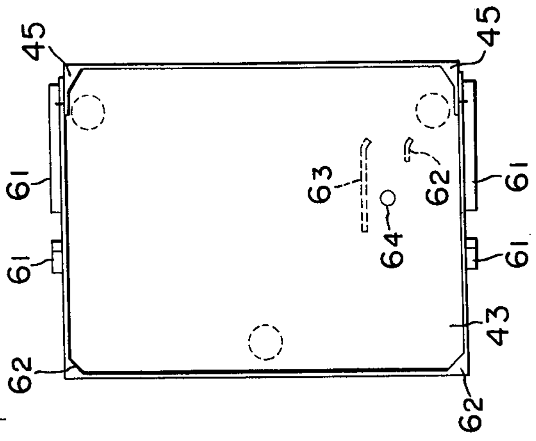
FIG. 29 is a plan view showing an embodiment of a size A4 cassette used with the present invention.
Figure 30:
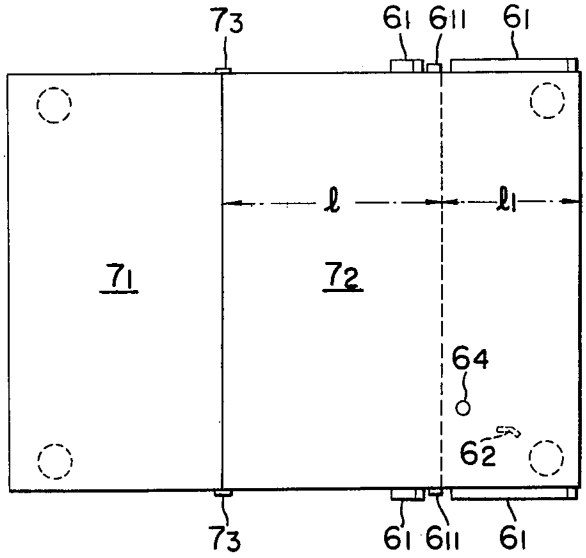
FIG. 30 is a plan view showing a size A3 cassette used with the present invention.
Figure 31:
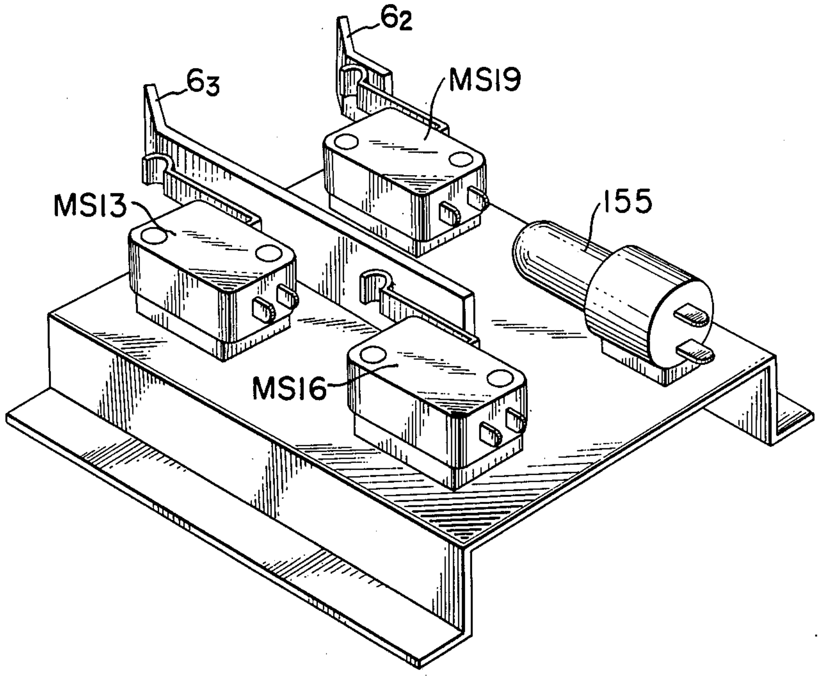
FIG. 31 is a perspective view for illustrating the relationship between the cams of said cassettes and the microswitches provided on the copying apparatus body.

FIGS. 13 and 28 illustrate an embodiment of the hinge 144 as applied for the connection of the original keep cover to the original carriage of an electrophotographic copying apparatus. As seen, the hinge pin 146 cut away as at $146_1$ is mounted so that the cut-away surface $146_1$ of the hinge 146 faces upwardly and extends substantially horizontally when the original keep cover 4 is horizontally placed on the carriage. The bearing members 147 and 148 are attached to the original carriage 3. To assemble the cover 4 to the carriage, the bearing member 148 is first cocked up about the pin $148_1$ as indicated by chain line, whereafter the hinge pin 146 attached to the cover is received into the bearing member 147, and then the cover 4 is raised to a substantially upright position so as to cause the cut-away surface $146_1$ of the hinge pin 146 to look out of the bearing member 147. Thereupon, the bearing member 148 is returned from its cocked position to the position as indicated by solid lines, thus completing the assemblage of the cover 4 to the original carriage 3.

In this position, the hinge pin 146 is embraced by the bearing members 147 and 148 while the bearing member 148 is restrained against pivotal movement about the pin $148_1$ by the engagement between the concave arcuate surface $148_2$ of the member 148 and the cylindrical surface of the hinge pin 146. Thus, a locked position is established except when the cover 4 is raised to a substantially upright position. Accordingly, the cover 4 is pivotally mounted to the original carriage without the possibility that usual opening and closing of the cover causes the bearing member 148 to be inadvertently opened to allow the escape of the hinge pin 146.

The disassemblage of the cover 4 from the original carriage 3 may be accomplished by carrying out the abovedescribed procedures in the reverse sequence.

Thus, the hinge of the present invention enables the connection and disconnection between the hinge pin and the bearing portion to be readily accomplished simply by adding a single step to the normal opening-closing operation, and moreover, the connection once established would not inadvertently be broken under normal conditions. Therefore, such hinge is suitable not only for attaching the original keep cover to the electrophotographic copying apparatus of the described type but also for attaching a lid to other instruments such as tape recorders and the like which require detachable attachment of the lid thereto.

Referring now to FIGS. 7 and 8, a connector 149 is provided on the underside of the original carriage and connected to a connector 150 in the apparatus body. This connection is broken when a book original is to be copied, because the original carriage is slightly displaced in that case as described previously. Also provided are cams 151, 152 and 153 (FIGS. 5 and 7) on the underside of the angle $107_2$. The cam 151 is engageable with a microswitch MS14 to detect whether the original carriage is in the position for copying sheet originals or in the position for copying book originals, thereby changing over the electric circuit. The cam 152 is engageable with a microswitch MS12 to stop the original carriage when it has moved backwardly during a book original copying cycle. The cam 153 is engageable with microswitches MS10 and MS11 to produce a reversing signal for formats A4 and A3.

In the illustrated embodiment, a cassette 6 loaded with a stock of transfer paper is inserted in the apparatus body 1 by means of rails $6_1$ and 154 (see FIGS. 14–17). A cam $6_2$ will strike a microswitch MS19 in the apparatus body and produce a signal indicating the proper positioning of the cassette. Where the cassette inserted contains paper of format A4 or smaller size, a cam $6_3$ will actuate switches MS13 and MS16 to change over the circuit into a position for copies of format A4. Cassette 6 has a semi-fixed lid $7_1$ and an openable lid $7_2$, which may be opened upon insertion of the cassette and also may serve as copy receiving tray. Separator pawls 45 are provided at the opposite sides of the paper feed end of the cassette 6.

Turning back to FIG. 2, a top cover 161 and a cover 163 for the drying-fixing means may be opened simultaneously by means of hinge 162. When the top cover is opened to a substantially upright position, almost everything except a few elements such as heater 58, discharger 60, etc. will be exposed over the conveyor belts 57. Therefore, if any jam should occur in the drying-fixing means 41, access may readily be provided to the jamming paper for removal thereof by opening the top cover 161.

The main body 166 of transfer paper conveyor means including the conveyor belts 57 is rotatably supported together with separator means including separator belt 40, by means of shaft 164, and is normally held in a predetermined position by a lock mechanism (not shown). By pulling a handle 165 after the top cover 161 has been opened, the lock mechanism may be released to allow the main body 166 to pivot about the shaft 164 in counter-clockwise direction, thus opening all the copy paper path succeeding to the register rolls $47_1$, $47_2$ so as to permit access thereto. Therefore, if any jam should occur in such section of the copy paper path, access may again be provided to the jamming paper for the removal thereof. At this instant, the separator belt 40 will be separated from the photosensitive drum 17 so that any transfer paper jamming in the separator portion can be readily removed.

Description will now be made in greater detail of partial modifications and further embodiments of the copying apparatus of the present invention.

As already noted, the copying apparatus of the present invention employs the wet type development system. The developing liquid used for such development system comprises a mixture of dielectric petroleum or like oil (carrier) and carbon or the like (toner). It is essential that the mixture of the carrier and toner should be at a predetermined ratio to ensure good image formation.

In order to maintain the mixture at a predetermined ratio, the developing liquid must always be replenished with toner in proportion to the decrease thereof at each copying cycle. Means for accomplishing this is known from prior patents and other publications, which show a device comprising a lamp and a photocell disposed in opposed relationship with developing liquid intervening therebetween, so that the photocell receives light transmitted through the developing liquid to convert the density variation in the developing liquid into an electrical signal, which operates a pump or like means to supply toner to the developing liquid.

However, such a toner supply device encounters an inconvenience in that even if the pump or like means receives a toner supply signal, no toner would be supplied unless toner is present in the container therefor.

The means for detecting the amount of toner used with the present invention eliminates the above-noted inconvenience, and it optically or electrically detects the amount of toner remaining in the developing liquid and produces an alarm representing "no toner" when the density of the developing liquid is reduced below a set value lower than a predetermined value.

Figure 34:
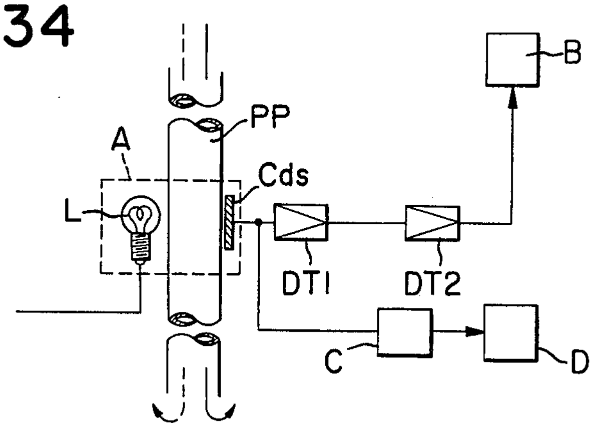
FIG. 34 is a block diagram for illustrating the principles of the means for detecting the amount of toner according to the present invention.

A specific embodiment of such means will be described in detail. Referring to FIG. 34, there is a block diagram for illustrating the principles of the inventive means. Letter A designates a first detector means comprising a lamp L and a light receiving element CdS; letter B designates an automatic toner supply means comprising a plunger, motor, solenoid, etc.; letter C denotes a second detector means comprising transistors Q4, Q5 and having a set value Y for the ratio of toner lower than a predetermined value X for the first detector means A; letter D denotes an alarm-stop means comprising a transistor Q6 and a lamp L4; and DT1 and DT2 are amplifiers.

Figure 37:
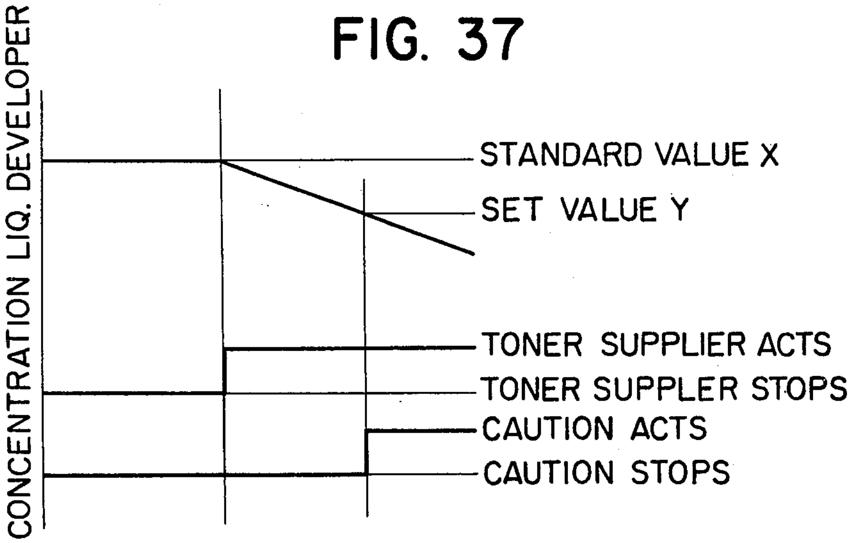
FIG. 37 is a graph for illustrating the circuit operating time with respect to the density of the developing liquid.
Figure 35:
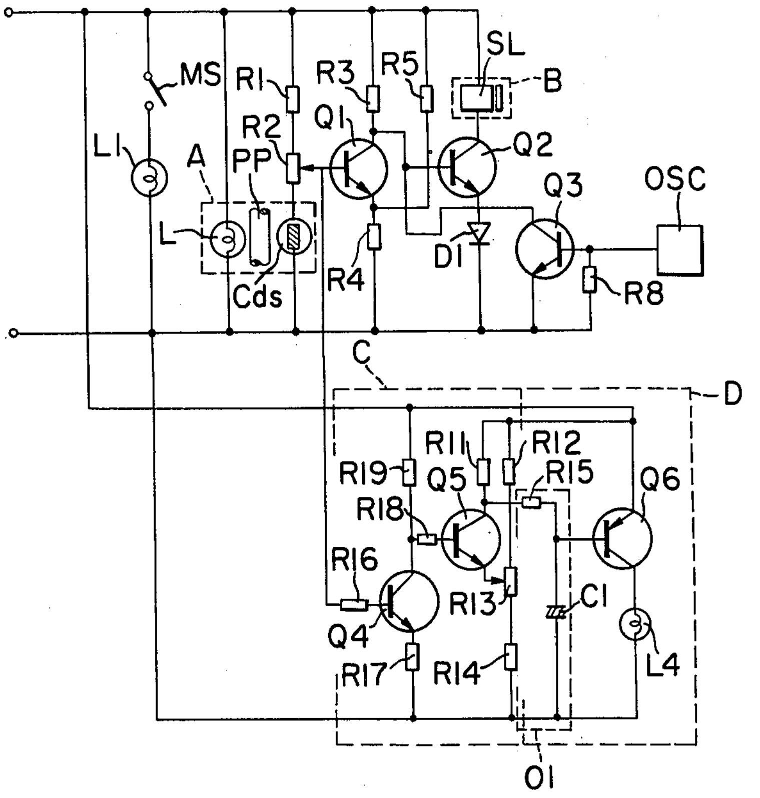
FIGS. 35 and 36 show the electric circuit therefor.

FIG. 35 shows an example of the electric circuit for the detector means of the present invention. Operation of such circuit will now be described. It is assumed that the quantity of the carrier liquid is normal and that the toner supply tank is filled with toner. If the density of the developing liquid passing through a transparent pipe PP exceeds the predetermined value X as shown in FIG. 37, the first detector means A will produce no detection signal and therefore, the transistors Q1 and Q2 will maintain "ON" and "OFF" states, respectively, so that the toner supply means B, i.e. solenoid SL will remain unenergized.

If the density of the developing liquid becomes lower than the predetermined value X, the first detector means A will detect such a reduced density and produce an output signal corresponding thereto and accordingly, the transistors Q1 and Q2 will be turned off and on, respectively, thus energizing the solenoid SL for toner supply.

If, however, no toner is then present in the toner supply tank, the toner supply will not actually take place in spite of the energization of the solenoid, thus resulting in a gradual reduction in the density of the developing liquid as the copy cycles proceed. When the density of the developing liquid is further reduced below the set value Y which is lower than the predetermined value X, the second detector means C will detect the set value Y with the aid of a voltage divided by resistors R12, R13, R14 and produce an output signal corresponding to such set value, thus turning on the transistor Q6 of the alarm-stop means D and accordingly an alarm lamp L4, which will thus indicate "no toner". Or alternatively, the main switch of the copying apparatus will be opened instead of the lamp L4 being turned on, thus deenergizing the copying apparatus itself.

With the above-described arrangement, the toner supply will continue as long as solenoid SL is energized. To avoid this, transistor Q2 serially connected with the solenoid SL may be arranged so as to be turned on and off under the control of pulse output from a pulse oscillator OSC via transistor Q3, whereby a predetermined amount of toner supply will be effected intermittently when no pulse output is produced with the transistor Q3 being turned off.

The present embodiment is featurized in that integration means O is additionally provided to ensure the aforesaid series of operations to take place more accurately. As shown in FIG. 35, integration means O comprising a resistor R15 and a capacitor C1 is inserted between the second detector means C and the alarm-stop means D so that the output signal produced upon each operation of the second detector means C may be stored and integrated in the capacitor C1, thus energizing the alarm-stop means D when the charge potential of the capacitor has reached a predetermined level.

Figure 36:
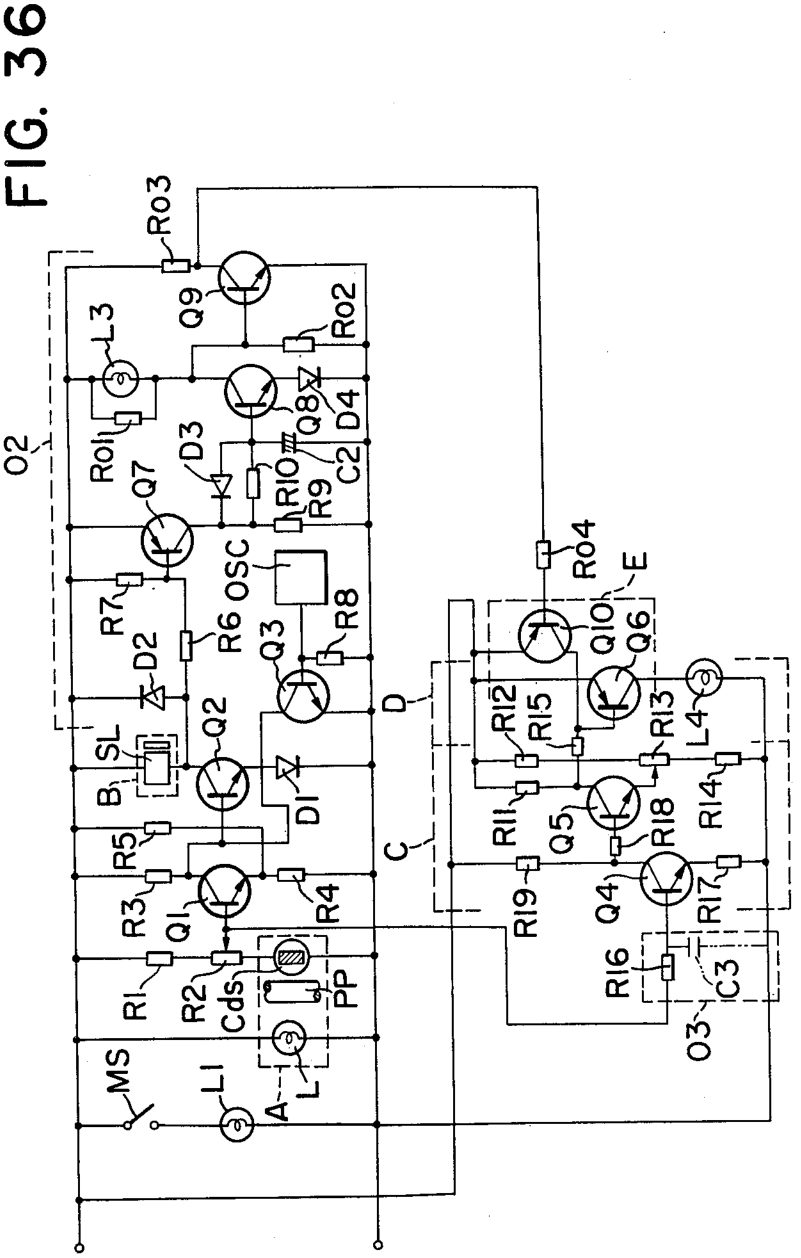

In the embodiment of FIG. 36, integration means O2 comprising transistors Q7–Q9 and capacitor C2 is connected with the output of transistor Q2 serially connected with solenoid SL. The transistor Q7 is turned on in synchronism with the energization of the solenoid SL, whereupon the capacitor C2 adapted to discharge through a circuit of

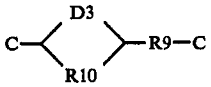

during a period longer than the oscillation period T of the pulse oscillator OSC is charged until a predetermined charge potential is reached, whereupon the transistor Q8 is rendered conductive to turn on an alarm lamp L3.

The accuracy of detection may be enhanced by arranging the integration circuit O2 so that the output of the last-stage transistor Q9 thereof is fed back to the alarm stop means D whereby logic means E may be controlled by such output and the output of the second detector means C. That is, in the shown embodiment, the transistor Q8 is turned on to thereby render transistors Q9 and Q6 non-conductive, so that transistor Q6 will be controlled only by transistor Q5. Accordingly, when transistor Q5 is in "ON" state, transistor Q6 will conduct to tun on the lamp L4, thus providing an alarm.

Alternatively, as shown by broken lines in FIG. 36, the integration means O may be arranged in such a manner that an integration means O3 comprising a resistor R16 and a capacitor C3 is inerted between the first detector means A and the second detector means C so that the second detector means C may be controlled by the integration value of such integration means.

Thus, according to the present invention, the amount of toner left in the developing liquid is detected and toner is automatically supplied when the ratio of toner to carrier becomes lower than the predetermined value X, and an alarm indicating "no toner" is produced when the ratio is reduced below a further lower set value Y. Therefore, when the stock of toner is exhausted, no toner supply operation will be repeated nor copying at any improper density will take place, thus maintaining the density of the developing liquid under a good condition. Also, the addition of the integration means leads to the elimination of any malfunction and to a higher accuracy of detection of the toner amount.

In FIGS. 35 and 36, MS designates a microswitch connected to a carrier liquid level indicator float and adapted to turn on an indicator lamp L1 when the liquid level becomes lower than a predetermined value.

Figure 38:
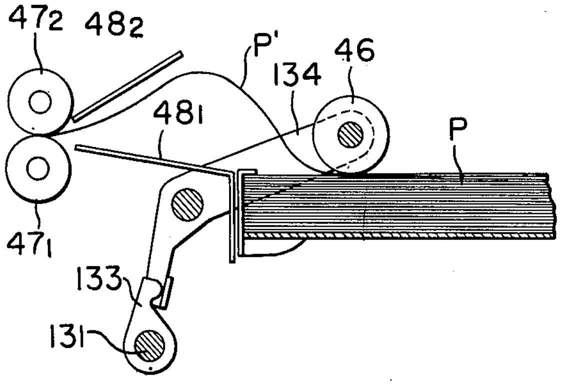
FIG. 38 illustrates the paper feed means of the present invention.

An embodiment of the paper feed means according to the present invention will now be described in detail. In FIG. 38, an uppermost sheet P′ of copy paper stock P is fed by paper feed roll 46 and the leading edge thereof strikes against the nip between register rolls $47_1$ and $47_2$ which are then stationary, so that the fed sheet will form a loop as indicated by P′. Subsequently, the register rolls $47_1$ and $47_2$ are driven by a signal from the apparatus, thus timing the paper feed. The operation of the paper feed roll and the register rolls has conventionally been controlled in the following manner: As soon as the drive to the paper feed roll 46 is connected, the drive to the register rolls $47_1$ and $47_2$ is disconnected to stop the register rolls; subsequently, the loop of the copy paper P′ is formed, whereupon the drive to the register rolls is connected and at the same time the drive to the paper feed roll is disconnected. According to this method, there are provided only two positions, i.e. a position in which the paper feed roll is stationary while the register rolls are rotating and a position in which the paper feed roll is rotating while the register rolls are stationary. Therefore, control of these positions may be simply accomplished by a single switch having a normally open contact and a normally closed contact corresponding to the said two positions, respectively.

Such a system has a demerit that no subsequent feed cycle is allowed before the leading edge of preceding copy sheet has passed through the register rolls, but such a demerit would lead to no essential inconvenience in the copying apparatus of the type using a reciprocable optical system, because this provides the time allowance for the return stroke.

However, if the aforesaid conventional system is used with a copying apparatus for sheet originals wherein no return stroke is involved and originals can be inserted in succession, paper feed means would encounter a barrier in accelerating the copying speed.

The present invention also intends to provide paper feed means which can reduce the time interval between a preceding copy sheet and a subsequent copy sheet by the use of a control circuit identical with the conventional system.

FIG. 38 shows an embodiment of such paper feed means. In this embodiment, paper feed roll 46 is normally driven to rotate from a drive source in the apparatus body. The paper feed roll 46 may also be vertically moved by reciprocal movement of paper feed control shaft 131 via paper feed lever and arm 133 and 134, so that the paper feed roll 46 may ride on the stock of copy paper P with the aid of its own weight or spring action so as to assume a paper drive position for feeding an uppermost paper sheet P', and may be raised away from the stock of paper P so as to assume a paper feed stop position. The register rolls $47_1$ and $47_2$ can repeat rotation and stoppage alternately.

Figure 39:
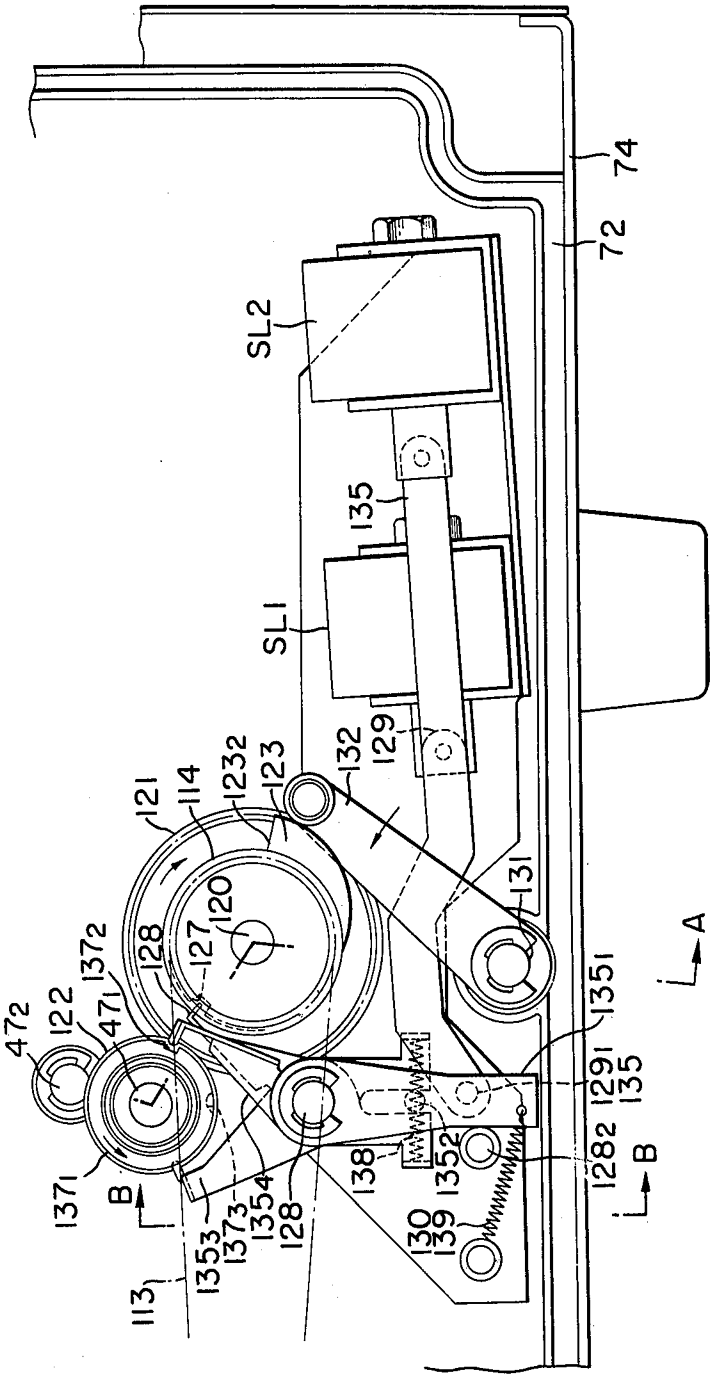
FIG. 39 is a front view showing an embodiment of the paper feed means.

As shown in FIG. 39, solenoids SL1 and SL2 are provided to effect the aforesaid control of the paper feed roll 46 and register rolls $47_1$, $47_2$. These solenoids may be energized by a single microswitch having a normally open contact and a normally closed contact, i.e. by a single paper feed signal. When a paper feed signal enters in synchronism with the rotation of the photosensitive drum 17, the normally open contact is closed to energize the solenoid SL1 so that the roll 46 is lowered to start paper feed. At the same time, the normally closed contact is opened to deenergize the solenoid SL2, but the register rolls $47_1$ and $47_2$ should not be allowed to stop their rotation before the leading edge of a preceding copy sheet P has passed through these rolls. Therefore, the rolls $47_1$ and $47_2$ continue to rotate until the preceding copy paper has completely passed therethrough. After the rolls $47_1$ and $47_2$ have stopped rotating, the leading edge of a succeeding copy sheet P' strikes the nip between the rolls $47_1$ and $47_2$ so that the copy sheet P' forms a loop. Thereafter, the paper signal is cut off to deenergize the solenoid SL1 and energize the solenoid SL2, so that the register rolls $47_1$ and $47_2$ resume their rotation to start the copy sheet P', whereupon the paper feed roll 46 is raised to stop its paper drive. Thus, timed paper feed cycles may be mechanically accomplished according to the present invention.

Figure 40:
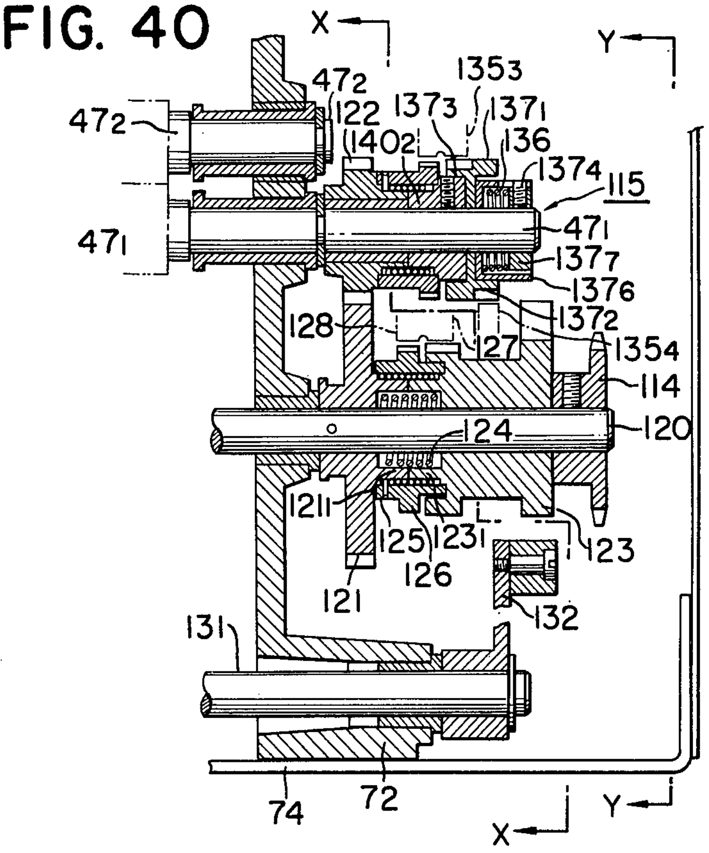
FIG. 40 is a cross-sectional side view taken along lines A—A of FIG. 39.

In FIGS. 39 and 40, shaft 120 is normally rotated as a paper feed control drive source via chain 113 and sprocket 114. A gear 121 secured to the shaft 120 has a cam 123 connected thereto by means of spring clutch 125. The cam 123 is adapted to pivotally move a cam follower 132 to thereby rotate the paper feed control shaft 131. The drive of the gear 121 is also transmitted to a gear 122 which is free relative to the shaft of the register roll $47_1$, and the gear 122 in turn drives the roll $47_1$ via a spring clutch 140. The aforesaid timed paper feed cycles may be provided by controlling the operation of the spring clutch 140 through a time delay mechanism.

When no paper feed takes place, the solenoids SL1 and SL2 are in inoperative and operative conditions, respectively. In such a case, the cam 123 pivotally moves the cam follower in clockwise direction as viewed in FIG. 39, and accordingly the shaft 131 and lever 133 (FIG. 38) are also pivotally moved in the same direction, thus raising the paper feed roll 46 away from the stock of copy paper P. Thus, with the solenoids being inoperative, the paper feed control lever 128 connected to link 129 by pin $129_1$ is pulled by spring 130 to rotate clockwise about the shaft $128_1$ until the lever strikes against a stop $128_2$, whereby the end pawl of this lever is engaged in a notch 127 formed in the flange of the cam 123 adjacent to the clutch 125, thereby stopping the cam 123 in that position, and at the same time, actuating a minute pawl on the circumferential surface of the outer wheel 126 of the spring clutch 125 to loosen the spring and disengage the clutch 125, thus cutting off the drive to the cam 123. A spring 124 for preventing reverse rotation is provided between an inner clutch wheel $121_1$ integral with the gear 121 and an inner clutch wheel $123_1$ integral with the cam 123.

Figures 42, 44:
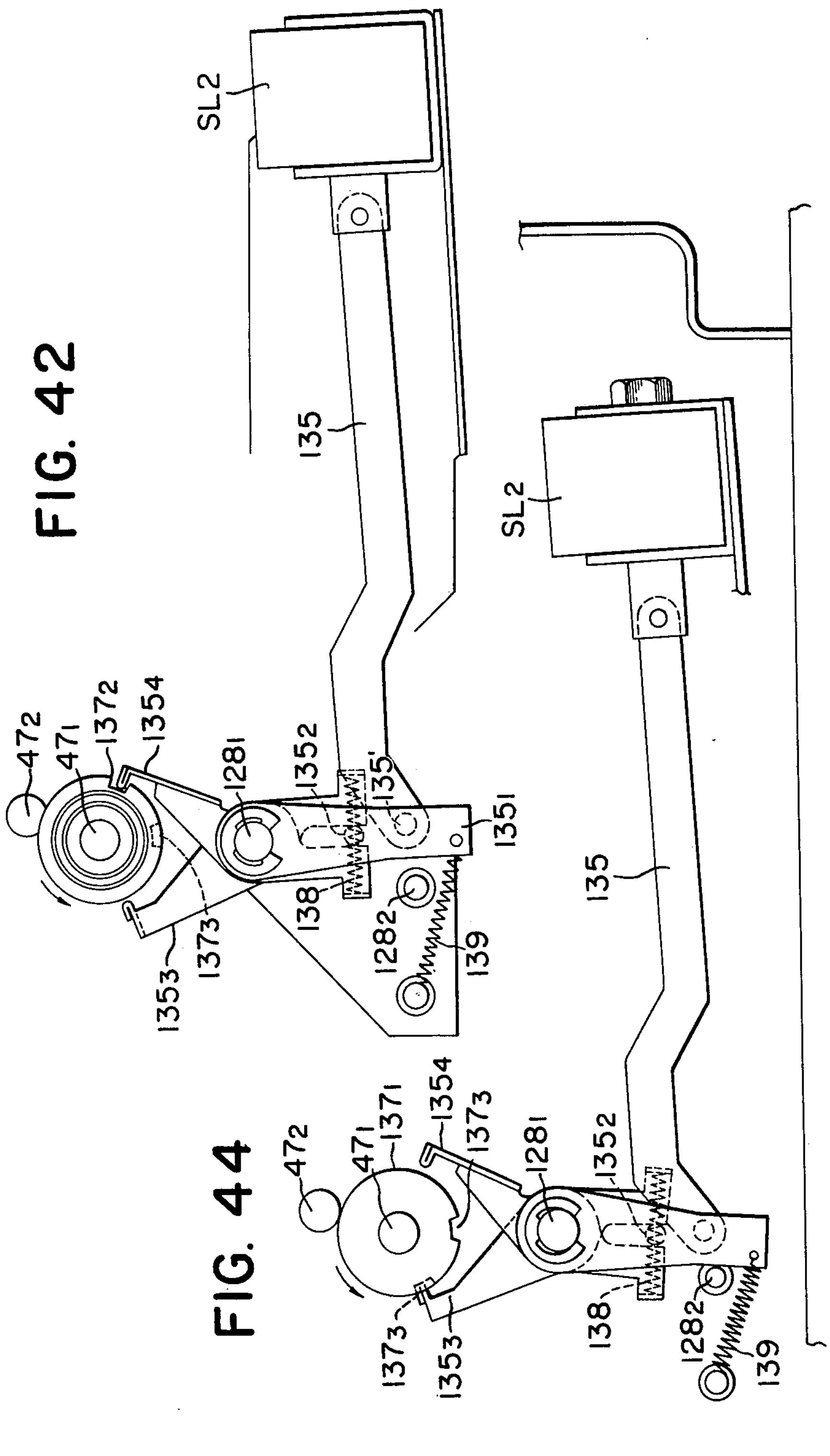
Figure 46:
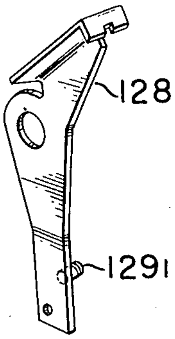
FIGS. 46 to 49 are perspective views of levers.
Figure 47:
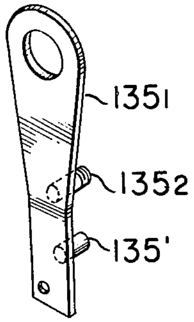
Figure 48:
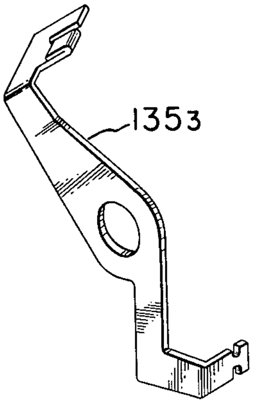
Figure 49:
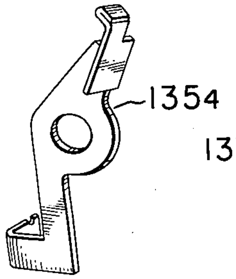
Figure 50:
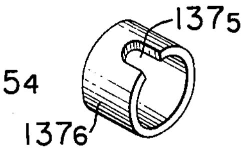
FIG. 50 is a perspective view of a friction cylinder.

Solenoid SL2 attracts link 135 rightwardly as viewed in FIG. 39 or 42, thus rotating pin 135' and lever $135_1$ in counter-clockwise direction. This causes pin $135_2$ or lever $135_3$ formed on the lever $135_1$ to be actuated in counter-clockwise direction, thereby disengaging the upper end pawl of the lever $135_3$ from the surface of delay drum $137_1$ which is free relative to the shaft of the register roll $47_1$. A lever $135_4$ connected to the lever $135_4$ by a spring 138 is also rotated counter-clockwise to engage its upper end pawl in the notch $137_1$ of the delay drum $137_1$. Thereupon, the register roll $47_1$ is driven by gears 121, 122 through spring $140_1$ and driven shaft $140_2$ of the spring clutch 140. The delay drum $137_1$, which is urged against the driven shaft $140_2$ by spring receivers $137_7$ and spring 136 secured to the register roll shaft $47_1$ and frictional keep ring $137_6$ slidably mounted on that shaft through the cooperation between pin $137_4$ and slot $137_5$, is prevented from rotating by the engagement between the said pawl $135_4$ and the notch $137_2$.

Figure 41:
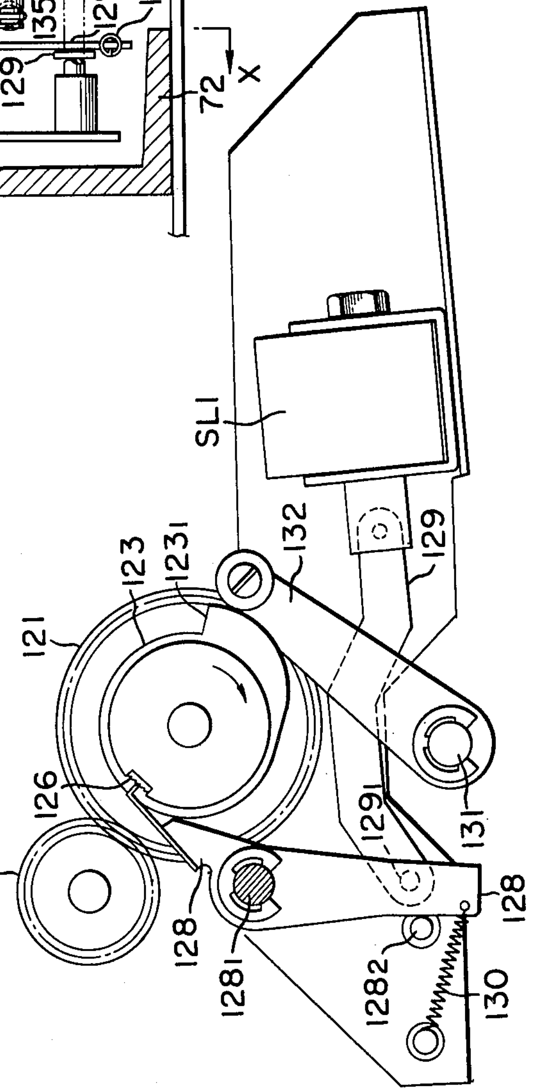
FIG. 41 is a front view of the paper feed control mechanism taken along lines X—X of FIGS. 40 and 45.

When a paper feed signal enters, solenoids SL1 and SL2 are energized and deenergized, respectively, by a common switch, as described previously. In FIG. 41, link 129 and lever 128 are actuated to release cam 123 and outer clutch wheel 126, so that the drive from the gear 121 is transmitted to spring 125 and cam 123, which is thus rotated clockwise to cause cam follower 132 to drop into the recessed step $123_2$ of the cam 123 and pivotally move in counter-clockwise direction, whereupon the paper feed roll 46 rides on the stock of copy paper P to start paper feed.

Figure 43:
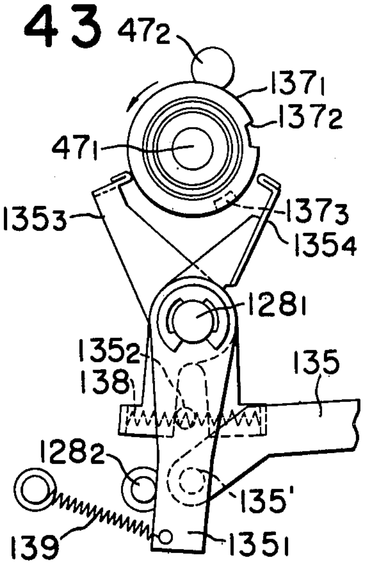
FIGS. 42 to 44 are front views of the register roll control mechanism taken along lines Y—Y of FIGS. 40 and 45.
Figure 45:
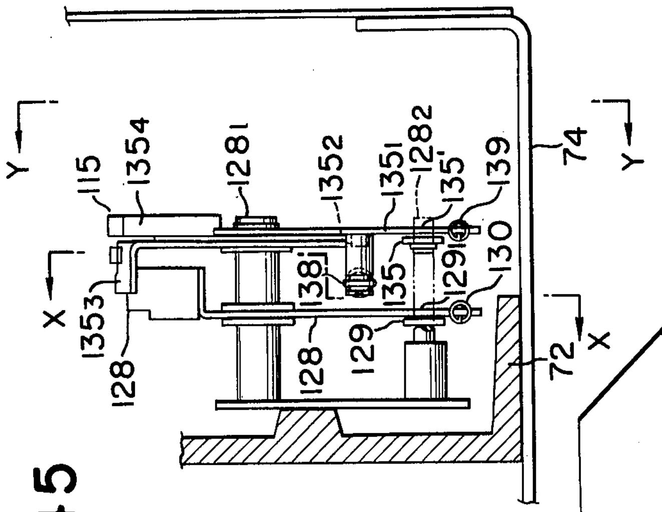
FIG. 45 is a side view taken along line B—B of FIG. 39.

Upon deenergization of the solenoid SL2, the lever $135_1$ is pulled back by the spring 139 and the lever $135_4$ is rotated clockwise, so that the delay drum $137_1$ is frictionally driven to rotate counter-clockwise by the driven shaft $140_2$. The lever $135_3$ is urged against the surface of the drum by the spring 138 (FIG. 43).

During the while the delay drum $137_1$ rotates about 300° as shown in FIG. 44, the preceding copy sheet has passed through the register rolls $47_1$, $47_2$ and the leading edge of the subsequent copy sheet has not yet reached the register rolls. At this point of time, the end pawl of the lever $135_3$ is engaged with another notch $137_3$ formed in the delay drum $137_1$ to prevent the rotation of the drum $137_1$ and at the same time to hold the coarse surface (or minute pawls) of the outer clutch wheel 140. As a result, the clutch spring $140_1$ is loosened to cut off the drive to the register roll $47_1$.

Thus, the leading edge of the copy sheet fed by the paper feed roll 46 strikes the nip between the register rolls $47_1$ and $47_2$ which are now stationary, so that the copy sheet forms a loop to provide timing for the copying.

When the paper feed signal disappears, the solenoid SL2 attracts the link 135 to disengage the lever $135_3$ from the notch $137_3$ and thereby release the outer clutch wheel 140, so that the register roll $47_1$ is rotated to start the copy sheet.

Thereupon, the solenoid SL1 is deenergized, but because the lever 128 is then riding on the circumferential surface of the cam 123 (which is greater in diameter than the outer clutch wheel 126), the cam 123 is rotated to actuate the cam follower 132 to raise the paper feed roll 46, whereupon the notch 127 is engaged by the lever 128 to bring about the position of FIG. 41 in which the cam 123 is stopped.

The delay drum $137_1$ is stopped at the position of FIG. 42 where the notch $137_2$ thereof is engaged by the lever $135_4$, and thus it is ready for a subsequent cycle.

In the above-described embodiment, the paper feed roll 46 is vertically moved to control the paper feed, but alternatively the control may be accomplished by intermittently rotating the paper feed roll while making it always bear against the stock of copy paper. In this latter case, the cam 123 may be replaced by a gear to rotate and stop the shaft of the paper feed roll 46.

Further, in the apparatus of the type in which an original carriage or an optical system for the through-slit exposure is reciprocated, the paper feed signal may also be produced by such reciprocating member.

The present invention is characterized in that a single signal source or a single drive source is used to accomplish a cycle of operation which comprises the steps of starting the paper feed by means of the paper feed roll 46, completing the feeding of a preceding copy sheet through the register rolls 47$_1$, 47$_2$ and stopping these rolls, feeding a subsequent copy sheet until the leading edge thereof reaches the register rolls to form a loop, starting the paper feed action of the register rolls, and stopping the rotation of the paper feed rolls.

To accomplish this, there is provided a transmission system leading from drive source 114, 120 via clutch 125 to rotatable paper feed control member 123, and a transmission system leading from the drive source via clutch 140 to register rolls 47$_1$, 47$_2$. Thus, a paper feed signal enters to release the rotatable control member 123 from its blocked position (resulting as from members 126–130) and thereby start the paper feed while starting to rotate timing members (such as delay drum 137$_1$, link 135, levers 135$_1$, 135$_3$, 135$_4$) which control the clutch in the transmission system leading to the register rolls; after a predetermined time (i.e. the time required for a preceding copy sheet to completely pass through the register rolls 47$_1$, 47$_2$), the timing members are operated to stop the register rolls 47$_1$, 47$_2$, whereupon the leading edge of a subsequent copy sheet strikes these rolls to form a loop; thereafter the paper feed signal is cut off to stop the paper feed, whereupon the register rolls 47$_1$ and 47$_2$ reverse their directions of rotation to start the copy sheet nipped therebetween. In this way, paper feed can be effected with accurate timing.

Moreover, the construction for this purpose can be provided by a relatively simple mechanical construction.

Furthermore, when applied to the copying apparatus of the type which permits successive insertion of originals, as described previously, the paper feed system of the present invention enables successive originals to be received in synchronism with the paper feed speed provided by the present invention, thus enhancing the copying speed.

Description will now be made specifically of the transfer paper separator means of the copying apparatus according to the present invention.

The transfer paper separator means of the present invention includes a narrow belt 40 endlessly passing over separator roll 49 and deflecting pulleys 50, 51, 52$_1$–52$_3$. A portion of the belt 40 which extends between separator roll 49 and pulley 52$_3$ is guided partially along the periphery of photosensitive drum 17 at one end thereof and interposed between transfer paper sheet P and the drum 17, and a portion of the belt 40 which extends between pulleys 52$_1$ and 52$_2$ is guided by the action of deflecting pulleys 50, 51 along a path deviated from the path of the transfer paper P, and is driven at the same speed as the photosensitive drum 17.

When the separator belt 40 is separated from the photosensitive drum 17 by the separator roll 49, it will act to force one side edge of the transfer paper P away from the photosensitive drum 17 and the transfer paper P may be bodily separated from the drum 17 due to its own self-supporting strength and to the force of the air blown from duct 54 through air outlet 55$_1$, and then directed toward a subsequent process station by conveyor belts 57.

Once it has completed such separating action, the belt 40 must return to its position just prior to a subsequent image transfer cycle in which another transfer sheet P is supplied to the drum 17. If the belt 40 contacts the drum 17 during such return travel, it would be stained by the developing liquid on the drum 17 and would in turn stain the transfer paper during the next separating cycle. Furthermore, the path for such return travel must not intersect the path of the transfer paper P.

Figure 53:
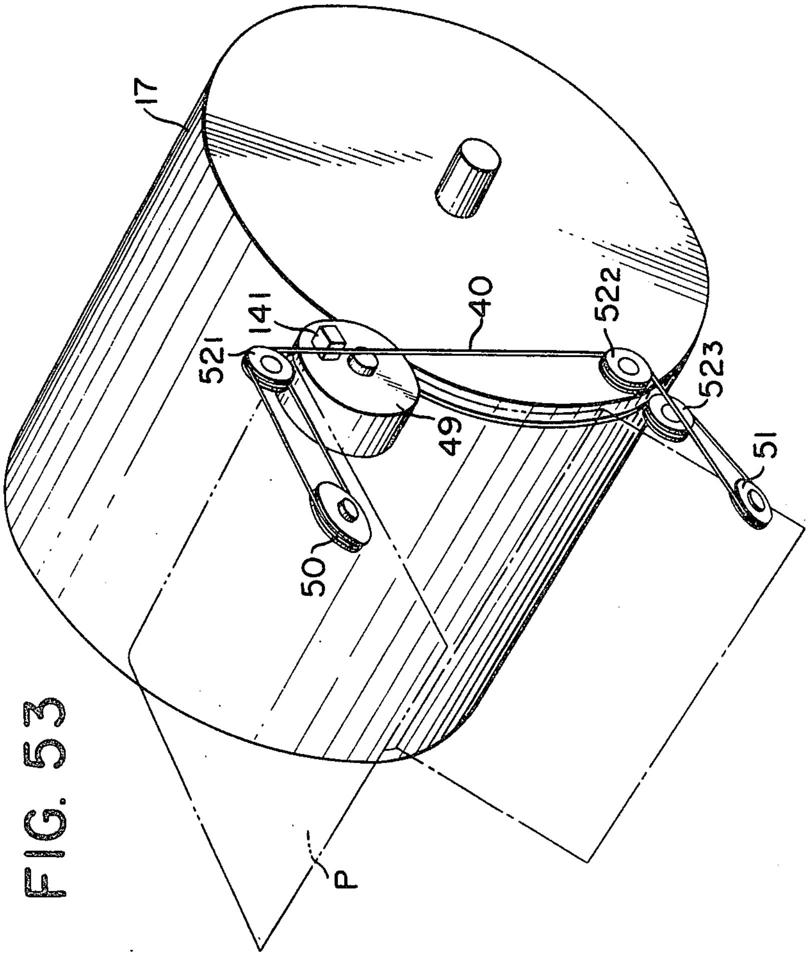
FIG. 53 is a perspective view showing the manner in which the transfer medium separator means of the present invention is arranged.

In order to provide a safe path of circulation, a pair of upper and lower deflecting pulleys 50 and 51 are used to provide two different planes of path, i.e. the separation path between the pulley 52$_3$ and the separator roll 49 and the return path between the pulleys 52$_1$ and 52$_2$. In this case, the belt 40 is twisted at four points in its path from roll 49 to pulley 50, in the manner as shown in FIG. 53. Twisting of a belt having a width would necessarily create some dilation in the twisted edge portions which would reduce the life of the belt. To avoid this, the deflecting pulleys 50 and 51 must be inclined so that the return path of the belt 40 may as much as possible approach the corresponding side edge of the transfer paper. The angle of such inclination may advantageously be within 45° with a good result, i.e. minimization of the angle of twist of the belt.

On the other hand, the separator belt 40 will contact the photosensitive drum 17 during the image transfer process with an undesirable result that the back side of the belt is stained with the developing liquid and the stained back side of the belt during its return course will in turn stain a subsequent transfer paper sheet P fed to be separated. Therefore, the present invention provides a belt cleaner 141 of felt or like material disposed in the return path of the belt 40 to remove the developing liquid from the stained belt, thus preventing transfer paper sheets from being stained.

Figures 54, 55:
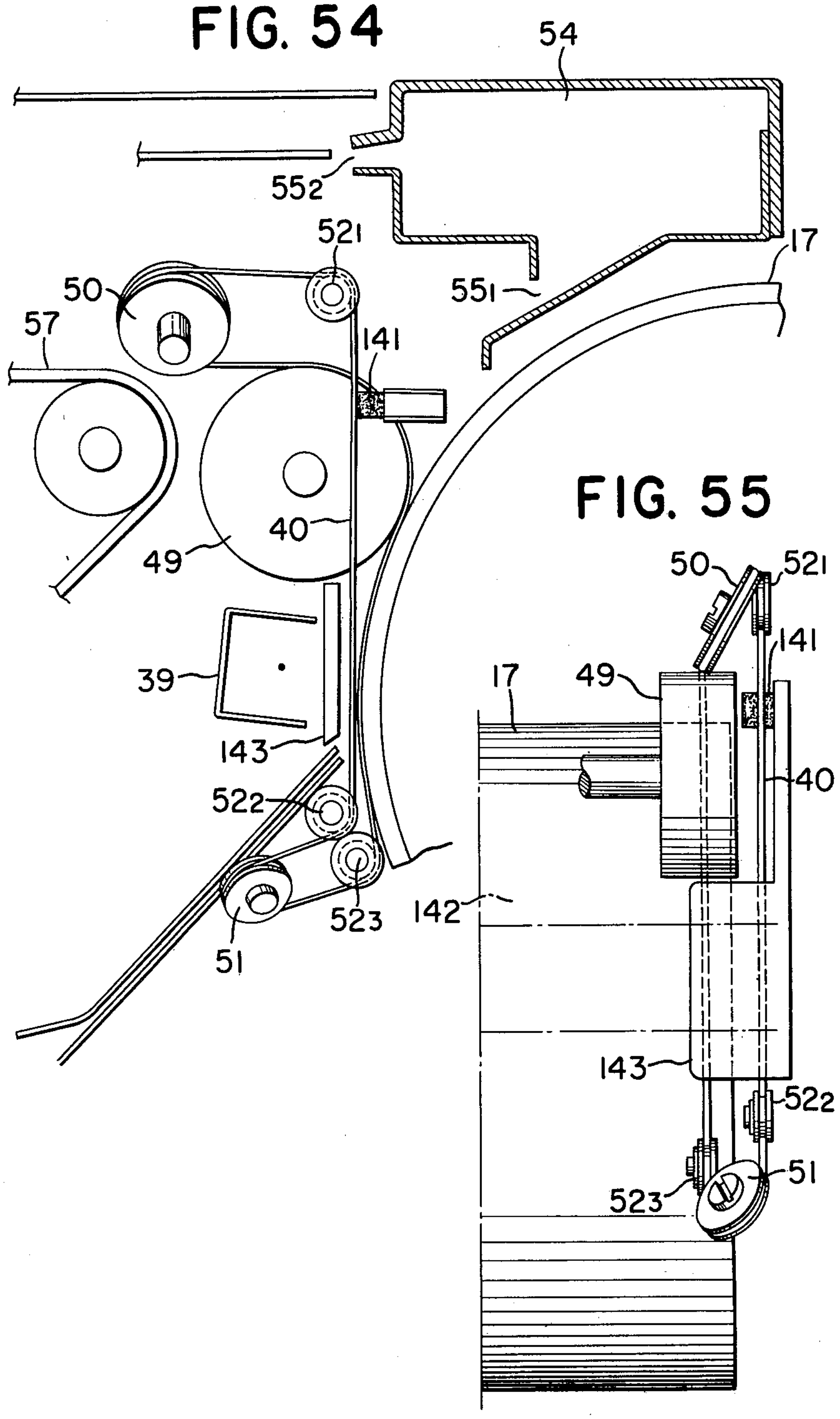
FIGS. 54 and 55 are a side view and a front view thereof.

An electrically charged area 142 (FIG. 55) provided by image transfer charger 39 is intended to transfer a formed image from the photosensitive drum 17 to a transfer sheet P, but it tends to transfer the toner in the developing liquid from the photosensitive drum to the separator drum 40. Such toner may also result in stained transfer sheets. To prevent such toner from being transferred to the separator belt, the present invention further provides a shield plate 143 disposed at the charged area 142 and between the charger 39 and the separator belt 40 so as to protect the belt 40 against electric charge.

An embodiment of the drying-fixing means according to the present invention will now be explained.

After the image transfer has been completed, a transfer paper sheet P is separated from the photosensitive drum 17 in the same manner as described above and then transported to drying-fixing means 41. According to the present invention, the transfer paper is dried by the use of heater 58 and air as mentioned previously. The air for drying the paper is blown from a blower disposed externally of the rear frame 72, through duct 54 and air outlet 55$_2$ into the drying-fixing means 41. At the same time, part of the air flows through the outlet $55_1$ of the duct 54 into a triangular space S provided between the photosensitive drum 17 and a transfer paper sheet P being separated therefrom, thus assisting in the separation of the paper P.

That part of the air thus used for the separation also flows with the transfer paper into the drying-fixing means 41.

In the drying-fixing means 41, the air is heated by the heater 58 and such heated air flow and the direct heat from the heater cooperate together to dry and fix the image on the transfer paper P. Thereafter, the air is sucked into a blower through an intake port 59 provided below the conveyor belts 57 and extending through the rear frame 72, and is further directed into the duct 54 for recirculation.

Such recirculation and reuse of the air once used for the drying-fixing process will never adversely affect the drying-fixing effect if a proper temperature condition is maintained. The reuse of the air heated by the heater 58 leads to a much greater thermal economy than in the case where such air is all discharged out of the apparatus, and it is also useful in providing a quick temperature rise in the drying-fixing means 41 at the initiation of the operation.

Further, the fact that part of the air used for the drying-fixing process is directed to the transfer paper separator station to assist in the paper separation leads to the elimination of any additional auxiliary means for separation, and this in turn leads to a compact and simple construction of the copying apparatus.

Furthermore, since the air outlet $55_2$ is disposed above the conveyor belts 57 and the intake port 59 is disposed below the conveyor belts 57, the air may flow through the drying-fixing means 41 in the direction from up to down with respect to the conveyor belts 57. This ensures the transfer paper P on the conveyor belts 57 to be both urged and attracted downwardly against these belts for positive transportation. Where only the downward attraction takes place, there would occur a danger that if a number of transfer sheets P in overlapped relationship is carried to the conveyor belts, only the lowermost one of them would be attracted to the conveyor belts while the other sheets would fly up to jam various parts of the apparatus. According to the present invention, however, both the downward urge and the downward attraction take place at a time so that even if a number of overlapped paper sheets is carried thereto the uppermost one of them is kept against flying up, thus ensuring a positive transportation of all the transfer sheets.

As described previously, the photosensitive drum 17 comprises a photosensitive layer covered with a transparent dielectric layer, and therefore, in an atmosphere of high humidity, the moisture might penetrate through the outer dielectric layer to the inner photosensitive layer, thereby reducing the contrast of the formed image thereon. According to the present invention, this may be avoided because part of the heated air blown through the air outlet $55_1$ for assisting in the paper separation impinges on the surface of the photosensitive drum 17 to suitably heat this drum and remove any moisture from the photosensitive layer thereof, thus preventing the reduction in the image contrast irrespective of a highly humid atmosphere.

Transfer paper passes through a narrow path from the paper feed station to the discharge port and this tends to cause jamming for various reasons. In this regard, a design must be made to permit ready removal of any jamming transfer sheet. The top cover 161 of the copying apparatus is adapted to be opened to substantially upright position by means of hinge 162, and the back side of the cover 161 is provided with means such as drying-fixing cover 163 and guide $163_1$ for directing the heated air from the duct 56 to the transfer paper P.

Figure 51:
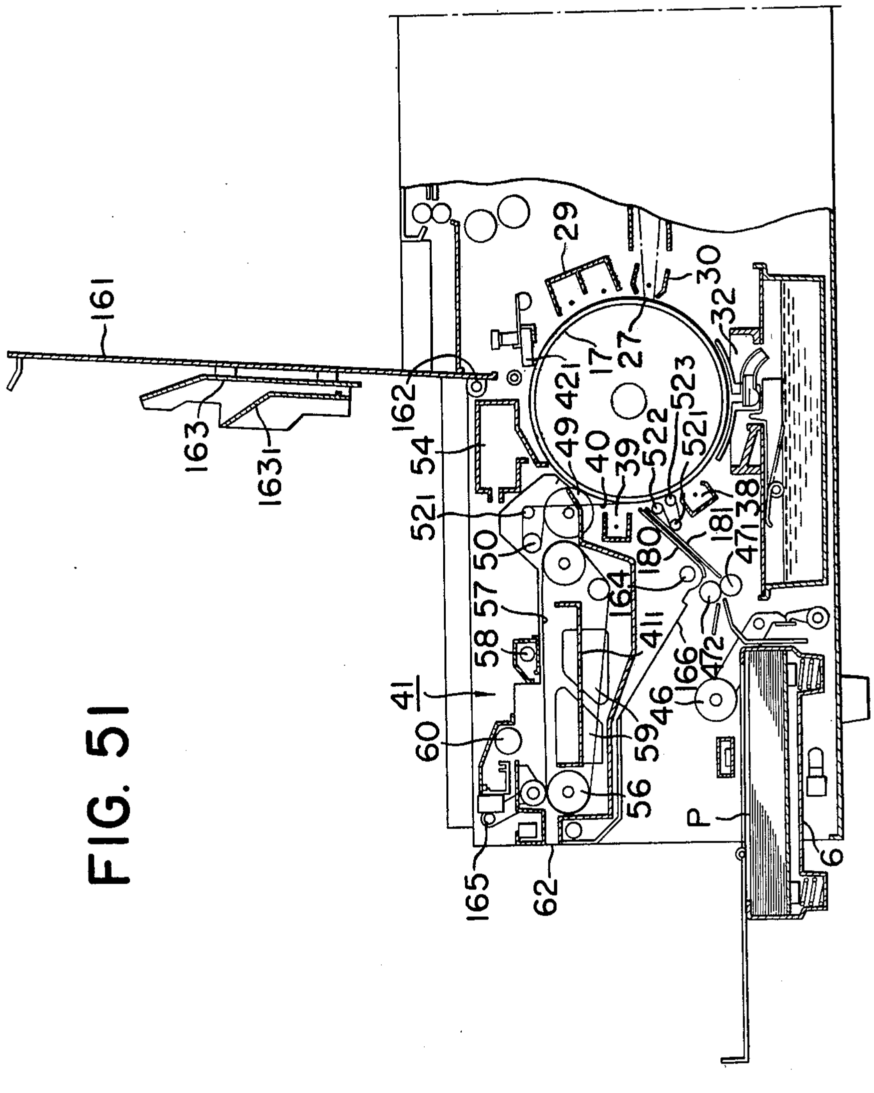
FIG. 51 is a longitudinal section of the drying-fixing means with the top thereof opened.

By opening the top cover 161 as shown in FIG. 51, the conveyor belts 57 in the drying-fixing station 41 may all be exposed except the space occupied by a few parts such as heater 58 and discharger 60, thus providing a ready access to any jamming paper in the drying-fixing station 41 for the removal thereof.

Figure 52:
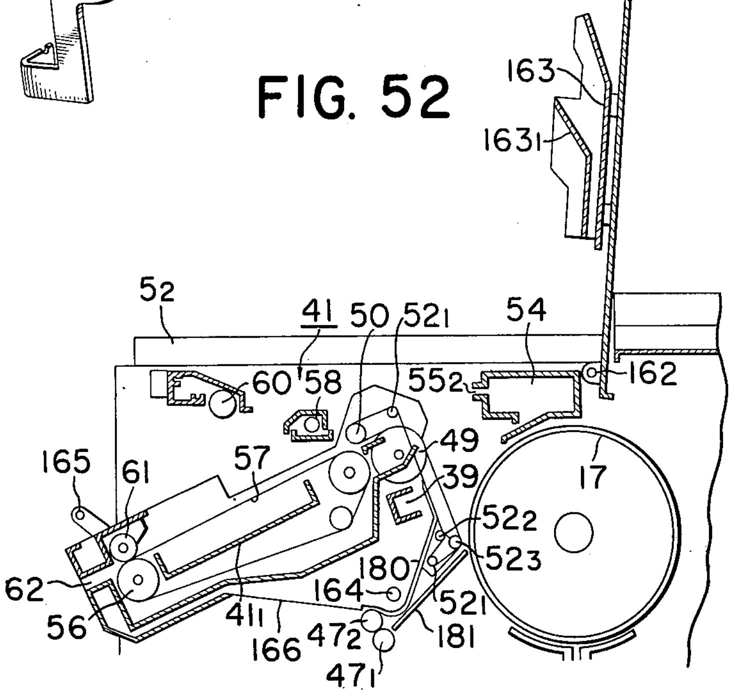
FIG. 52 is a longitudinal section of the drying-fixing means with the top and bottom thereof opened.

A main plate 166 for the transfer paper conveyor portion is provided to support various elements forming the lower portion of the drying-fixing means 41 such as conveyor belts 57, reflector plate $41_1$ and heated-air intake port 59, and some other elements adjacent to one end of the photosensitive drum such as separator belt 40, image transfer charger 39, transfer paper guide 180, etc. The main plate 166 is mounted to the apparatus body for pivotal movement about shaft 164 in counterclockwise direction, in the manner as shown in FIG. 52.

After the top cover 161 has been opened as described above, the main plate 166 may be pivoted or opened so as to provide a large access space between the transfer paper separator assembly and the photosensitive drum, thus permitting any jamming paper sheet in such portion to be removed therefrom.

Thus, according to the present invention, all the path for transfer paper is readily accessible for the proper treatment of any jamming paper sheet therein. In addition, such paper treatment can be done readily and quickly by any layman because of the simple construction in which the upper portion of the drying-fixing means may be opened upwardly and the lower portion may be opened downwardly.

An embodiment of the means for repeating the copying cycle in the copying apparatus of the present invention will be described hereunder. Such means is effectively applicable to repeat the copying cycle as frequently as desired. For example, where each ten copies of five different originals are to be obtained by the copying apparatus of the present invention, the number of copies desired may be set to the value "10", whereafter a first original may be set in position and then a copy button depressed, whereby the apparatus will continue its operation until ten copies of the first original are produced, whereupon the apparatus is stopped. Simply by depressing the copy button again, the same process may be repeated for each of the other four originals, thus providing ten copies of each of them.

With the conventional system for such repeated operation, resetting to a set value has taken place during the depression of the button and this could cause an error in the desired number of copies because the resetting could not be completed if the button was released after a short-time depression. According to the present invention, however, no such error can occur because once the copying cycles up to a set value have been completed, the resetting to the set value is automatically effected as will be described below.

Also, the conventional system has required the operator to rotate a set dial when he wants to urgently stop the copying apparatus for some reason or other, whereas the present invention enables the apparatus to be quickly stopped simply by depressing an urgent stop button.

Furthermore, according to the present invention, a start button is disposed centrally of the copy cycle setting dial and this leads to the compactness of the entire means. The other features of the present invention will become more fully apparent from the following description of an embodiment thereof.

Figure 56:
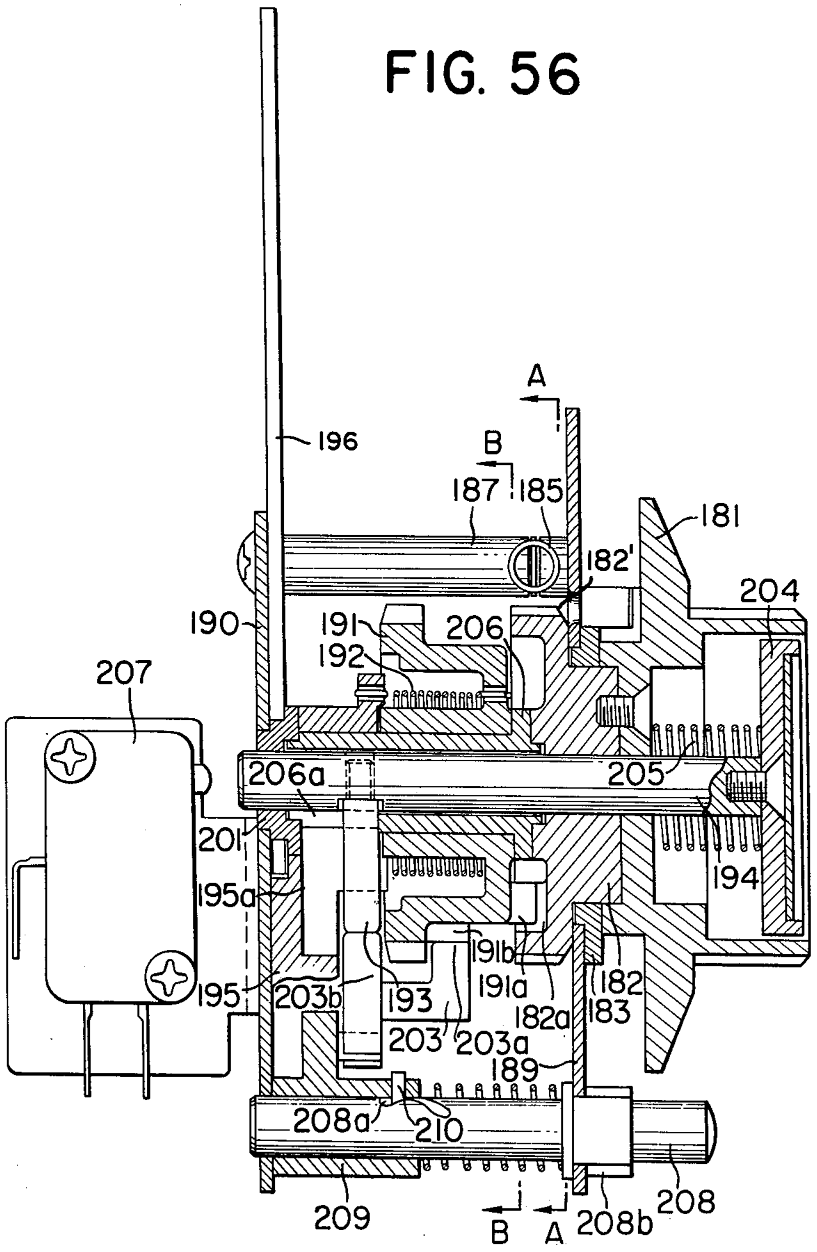
FIG. 56 is a cross-sectional view of the copy repeating mechanism used with the present invention.
Figure 57:
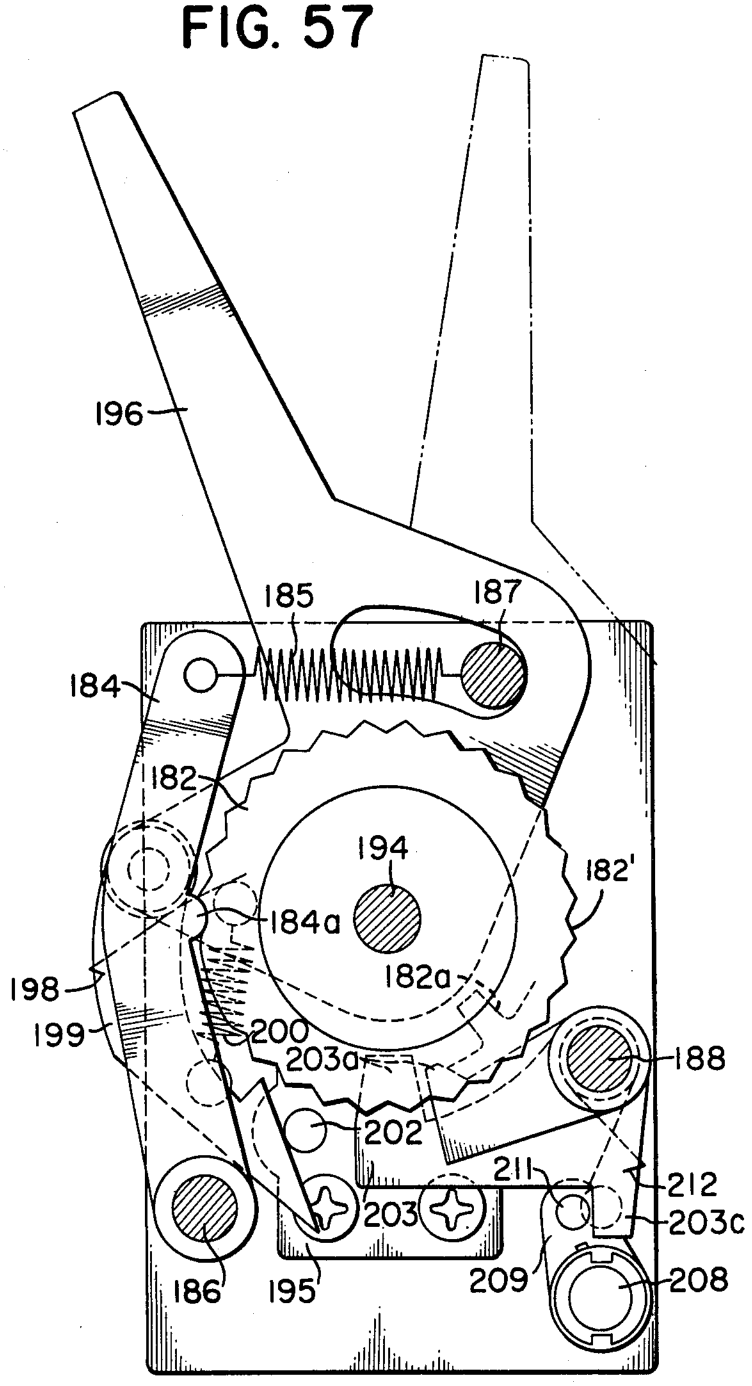
FIG. 57 is a sectional view taken along lines A—A of FIG. 56.

Referring to FIG. 56, a copy cycle setting dial 181 is integral with a click wheel 182 and rotatably supported by bearing 183. The circumferential surface of the click wheel 182 is formed with teeth 182' corresponding to the numbers provided on the copy cycle setting dial. A projection 184*a* formed on a click 184 is urged into engagement with one of said teeth by a spring 185, so that the number of copy cycles once so set can never be changed by a shock which may occur during the resetting (FIG. 57). One end of the click 184 is pivotally mounted on a stay 186 extending between a front side plate 189 and a rear side plate 190, thus providing a pivot point for the click 184. The back side of the click wheel 182 has a projection 182*a* which provides a stop member engageable with the projection 191*a* of ratchet wheel 191 to determine the set position of the ratchet wheel. The outer circumference of the ratchet wheel 191 is formed with teeth, one of which is engaged by a pawl 199 attached to a support shaft 197 secured to an actuator arm 196, said pawl 199 being slightly urged against the ratchet wheel 191 by a pawl spring 198. The ratchet wheel 191 may be sequentially rotated as the pawl 199 is pivotally moved with the pivotal movement of the actuator arm 196.

Figure 58:
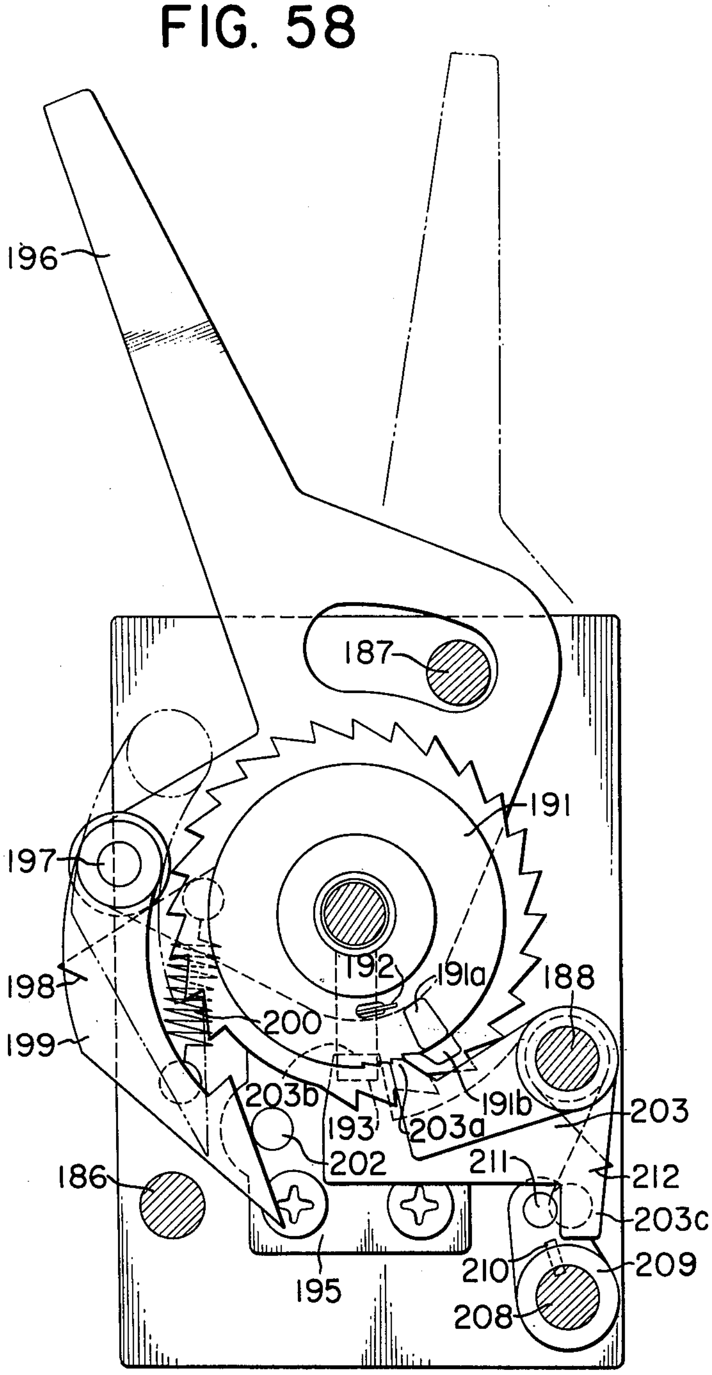
FIG. 58 is a cross-sectional view taken along lines B—B of FIG. 56 and showing the position in which the last cycle of the repeated copying operation is about to start.
Figure 59:
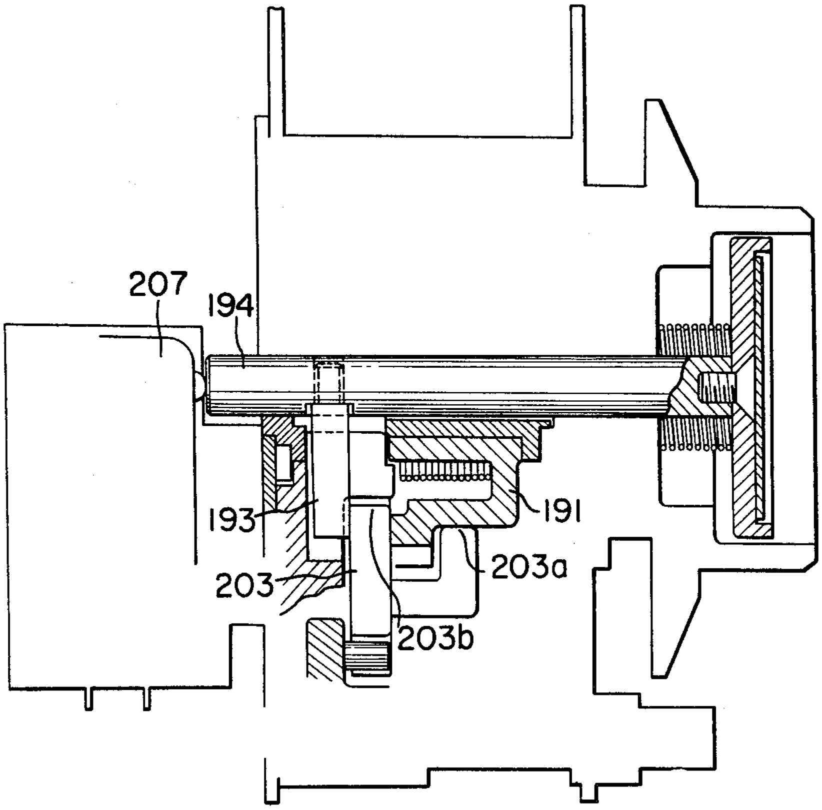
FIG. 59 shows the position in which a copying cycle is being repeated in FIG. 56.

The actuator arm 196 is pivotally movable about a bearing 201 fixed to the rear side plate 190, and is normally biased counter-clockwise by a spring 200. The arm 196 may be rotated clockwise against the force of the spring 200 by a signal applied from the apparatus to be controlled by the present means. The arm 196 is also formed with a slot in which the stay 187 is received to control the amount of movement of the arm. When no signal is applied to the present means, the pawl 199 is disengaged from the toothed surface of the ratchet wheel 191 by a pin 202 secured to a member 195, in the manner as shown in FIG. 58.

Figure 60:
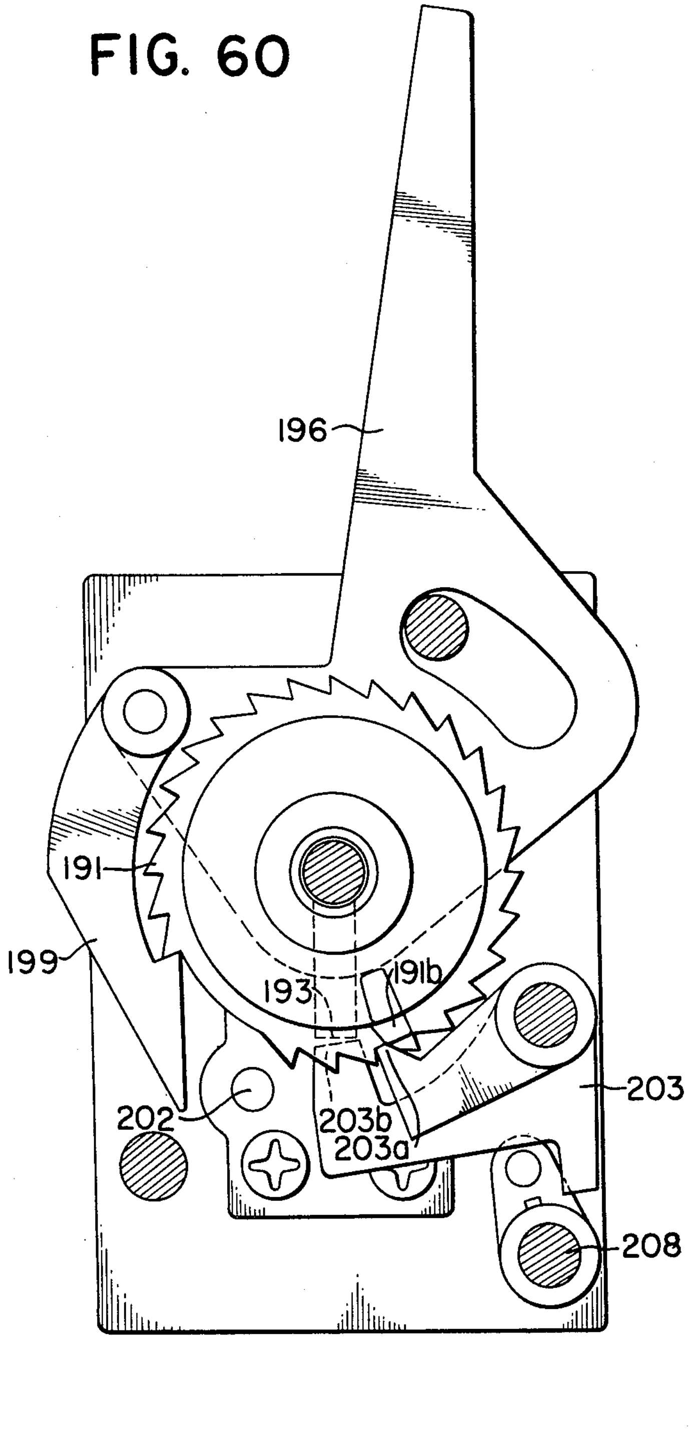
FIG. 60 shows the position in which the last copying cycle is progressing in FIG. 58.

When a signal is applied to the arm 196, the pawl 199 is engaged with one tooth of the ratchet wheel 191 as shown in FIG. 60, thereby advancing the ratchet wheel by one tooth. The ratchet wheel 191 has a reset spring 192 therein for biasing the ratchet clockwise. Disposed around the outer circumference of the ratchet wheel 191 is a control member 203, which is biased for clockwise rotation about the stay 188 and which has a projection 203*a* engageable with the projection 191*b* of the ratchet wheel 191. This projection 191*b* is adapted to engage the control member 203 during the last one of the set copying cycles. Disposed at the center of the copy cycle setting dial 181 is a push button 204 which is connected to a center shaft 194. The center shaft 194 is mounted for movement in the axial direction with respect to the ratchet wheel 182 by means of bearing 201, and biased rightwardly (as viewed in FIG. 56) by a spring 205. Intermediately of and perpendicularly to the center shaft 194 there is fixed a member 193 for preventing the rotation of the center shaft and this member is slidable in a cut-away portion 206*a* formed in a bushing 206 interposed between the click wheel 182 and the bearing 201. When the shown device is inoperative, the member 193 bears against the right end of the cut-away portion 206*a*, as shown in FIG. 56. The member 193 is adapted to move in a groove 195*a* formed in a guide member 195. On the back side of the preset device there is provided a microswitch 207 actuated by the axial thrust of the center shaft. Also provided is an urgent stop button which is axially movable but prevented from rotation by groove 208*b*. Intermediately of the push button 208 is formed a helical groove 208*a* in which is received a pin 210 secured to a pivotable member 209, so that the pivotable member 209 may be pivoted clockwise (as viewed in FIG. 52) when the push button 208 is depressed. A pin 211 is secured to the pivotable member 209 and engageable with the projection 203*c* of the control member 203.

Figure 61:
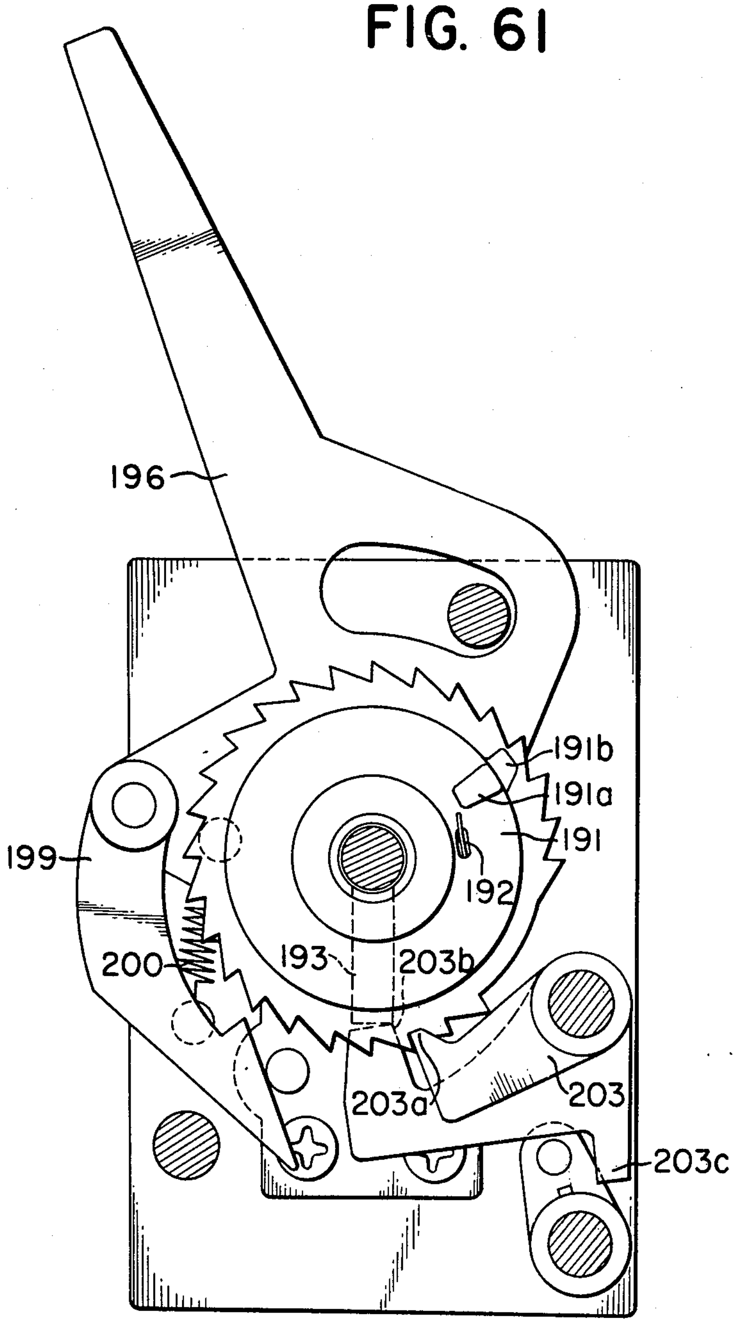
FIG. 61 shows the initial position in FIG. 58.

In operation, the copy cycle setting dial 181 is first rotated until it is set to a desired number of copy cycles. During that time, the pawl 199 is disengaged from the tooth of the ratchet wheel 191 as shown in FIG. 61, and the projection 203*b* of the control member 203 is engaged and stopped by the end of the member 193 secured perpendicularly to the center shaft while another projection 203*a* is disengaged from the outer circumference of the ratchet wheel. Therefore, the ratchet wheel 191 is rotated by the force of the spring 192 until the projection 191*a* of the ratchet wheel strikes the projection 182*a* of the click wheel 182 which is to be set together with the dial 181, thus setting the click wheel to its start position. Subsequently, the start button at the center of the dial is depressed to thereby cause the center shaft to actuate the microswitch 207 and at the same time release the engagement between the member 193 and the projection 203*b* of the control member 203, while the other projection 203*a* is biased into engagement with the outer circumference of the ratchet wheel by the spring 212 to thereby prevent reverse rotation of the ratchet wheel. When the start button is released, the member 193 secured perpendicularly to the center shaft is engaged with one side of the projection 203*b* of the control member to maintain the start button in its depressed position. The other side of the projection 203*b* is engaged with the edge of the ratchet wheel to thereby ensure the prevention of the ratchet wheel's reverse rotation.

Since the microswitch 207 has been actuated, the apparatus is started to reciprocate the actuator arm 196. The pawl 199 advances the ratchet wheel 191 against the friction between the ratchet wheel and the projections 203*a*, 203*b* of the control member and against the force of the spring 192.

The position before the last one of the set copy cycles is shown in FIG. 58. The last copy cycle is shown in FIG. 60. In the last copy cycle, the projection 191*b* of the ratchet wheel pushes the projection 203*a* of the control member 203 to rotate this member in counterclockwise direction. As a result, the square engagement between another projection 203*b* and the member 193 perpendicularly secured to the center shaft is released to allow the center shaft to be returned by the spring 205, thus opening the microswitch 207. When the pawl 199 is disengaged from the ratchet upon completion of the last cycle (FIG. 61), the engagement between the projection 203*b* of the control member and the member 193 secured perpendicularly to the center shaft is now in the form of an end-to-end engagement which is insufficient to provide a sufficient friction to prevent reverse rotation of the ratchet wheel 191, whereby the ratchet wheel is reset to its initially set value.

A second depression of the start button will cause the above-described operation to be repeated.

When it is desired to urgently stop the apparatus during the repeated copying cycle, the stop button 208 may be depressed to cause the pivotable member 209 to pivot clockwise due to the described construction, thereby bringing the pin 211 secured to that member 209 and the projection 203*c* of the control member into engagement, and thus actuating the control member in counter-clockwise direction.

The control member 203 is thus given the same movement as when the repeated copy cycles have been completed, so that the apparatus is stopped to reset the ratchet wheel.

In the illustrated embodiment, the friction between the projection 203*a* of the control member and the outer circumference of the ratchet wheel 191 is utilized as detent means for the ratchet wheel, but a more reliable detent effect would be provided by providing the ratchet teeth with coarse surface.

Description will finally be made of the electric control in an embodiment of the copying apparatus according to the present invention.

In the copying apparatus according to the previous embodiment, the original carriage 3 is provided with a book original carriage means 67 (glass plate) and a sheet original transport means 2 supported on the angles slidable along rails $5_1$, $5_2$ by means of rollers. The sheet original transport means has a gear 89 at the forward end thereof, and this gear is driven from drum gear 77 integral or coaxial with photosensitive drum 17 via relay gears 109–111, as shown in FIGS. 3 and 4. The drive imparted to the gear 89 is transmitted via synchro-pulleys 90, 92 and synchro-belt 91 to roll $21_1$, and further via synchro-belt 93 to pulley 94, and thence to roll $18_1$ under the control of clutch CL1. The drive from main motor M1 of FIG. 2 is transmitted via sprocket wheel 96, chain 95, sprocket wheel 98, relay shaft 97 and gear 108 to drive drum gear 77 and photosensitive drum 17. When sheet originals are to be copied, gears 89 and 11 are in engagement, but when book originals are to be copied, gear 89 is displaced out of engagement with gear 11 as described below.

Chain 95 also drives sprocket wheels 99 and 100 rotatably mounted on the shafts of electromagnetic clutches CL2 and CL3. Behind the clutches CL2 and CL3, sprocket wheels 101 and 102 different in number of teeth are secured to the shafts of these clutches, and these two sprocket wheels are connected by a chain 103. Attached to the shaft of the clutch CL2 is a drum 104 on which is wound a wire 105 in several turns. The wire 105 is guided therefrom in a cross fashion to pass around a pulley 106, and has the opposite ends thereof secured to the front and rear ends of the original carriage 3. The original carriage may be reciprocated by selectively using the two clutches CL2 and CL3 to rotate the drum 104 in normal and reverse directions. The gear ratio of gears 101 and 102 is selected such that the return stroke of the carriage may be faster than the forward stroke.

When copying operation is started and preparatory operations for developing and other various means are completed, the photosensitive drum 17 begins rotating while the original carriage 3 is stopped in its normal position for copying sheet originals with gears 89 and 111 in engagement and with rolls $21_1$, $21_2$, $18_1$, $18_2$ being in rotation. When a sheet original is inserted from the right of the apparatus into the nip between rolls $18_1$ and $18_2$, it is transported leftwardly. As soon as the leading edge of the sheet original is detected by lamp 19 and light receiving element 20, the rolls $18_1$ and $18_2$ are temporarily stopped from rotating, and thus the original is also stopped.

When the photosensitive drum 17 comes to a predetermined position, the cam 157 of drum gear 77 actuates microswitches MS1 and MS4 (operable for format A4 or smaller sizes) in succession to produce an original start signal, whereupon the rolls $18_1$ and $18_2$ resumes their rotation so that the original is further transported leftwardly in synchronism with the rotation of the photosensitive drum 17 and discharged upwardly out of the apparatus by rolls $21_1$ and $21_2$.

Change-over of the operation mode to a book original copying mode may be accomplished by depressing change-over button 13 to cause counter-clockwise pivotal movement of lever $63_2$ about pin $63_3$, as viewed in FIG. 4, through the cooperation between lever $13_1$ and projection $63_1$, thus lowering roll 63 to disengage this roll downwardly from sheet original positioning groove 65 formed in cam 64 mounted to the lower portion of the original carriage 3. When the original carriage 3 is moved leftwardly, the roll 63 is received into book original positioning groove 66 by means of spring $63_4$, and the sheet original transport means 2 is also moved with the carriage 3 to break the engagement between gears 89 and 111. At this time, the forward end $67_1$ of the original carriage's glass plate 67 assumes the position which was occupied by the photoelectric means 19, 20 during the sheet original copying mode.

Thereupon, a book original to be copied is placed on the carriage's glass plate 67 with the forward end thereof registered with the forward end $67_1$ of the glass plate, and then the book original is held by the keep cover 4 (FIG. 2). Thereafter, the copy button 14' (FIG. 1) is depressed to produce an original start signal from the photosensitive drum 17 in the same way as described above with respect to case of sheet original. This signal energizes an electromagnetic plunger SL3 so that upon disengagement of the roll 63 from the groove 66 the original carriage 3 is moved forwardly in synchronism with the photosensitive drum 17 to accomplish a through-slit exposure.

Upon completion of such exposure, the original carriage 3 stops its movement in response to its own signal corresponding to the size of the book original, whereupon the carriage 3 assumes its rapid backward movement and stops at its start position determined by roll 63 and groove 66.

Where multiple copies of the same book original are to be obtained continuously, this may readily be accomplished by means of the aforesaid counter means 14 operatively associated with the copy button 14'. At each reciprocal movement of the original carriage, cam 64 and crank 69 are rotated to actuate the ratchet mechanism of the counter means so that the original carriage 3 is reciprocated as frequently as the set number of copies, whereafter the copy button 14' is released to stop the original carriage 3.

In the present embodiment of the copying apparatus, the photosensitive drum 17 can copy originals of variable width up to that of JIS A3 and has a circumferential length somewhat greater than the length of A3 format. Therefore, where the originals to be copied are sheet originals, one of sheet originals of A3 format may be fed for copying per full rotation of the photosensitive drum or two of sheet originals of A4 format may be fed at a time in a direction perpendicular to the longitudinal axis thereof. If book originals are to be copied, the forward stroke (exposure stroke) of the original carriage 3 is followed by the return stroke which requires substantially as much time as the forward stroke, and thus the length of time required for providing one copy of a book original will be approximately twice the time required for one copy of a sheet original. More specifically, for originals of A3 format, one copy may be provided every two full rotations of the photosensitive drum, and for originals of A4 format, one copy may be provided per full rotation of the photosensitive drum.

Such cycle difference arising from the different sizes of paper may be detected by a signal from the cassette 6, and the cycle difference arising from the different types of original may be detected by a signal resulting from the change in position of the original carriage.

Formats A3 and A4 are taken as examples in the illustrated embodiment. As shown in FIGS. 28–32, a cassette for format A4 or smaller size of paper (FIG. 29) or a cassette for format A3 (FIG. 30) is provided with a pawl $6_2$ for providing a signal representing the completion of the cassette loading through microswitch MS19. The cassette for format A4 or smaller size (FIG. 29) is provided with a cam $6_3$ for actuating microswitches MS13 and MS16. Photoelectric means 155 and 156 are provided to detect the presence of transfer paper through apertures $6_4$ and $43_1$ formed in the bottom and intermediate plates of the cassette, respectively.

As shown in FIG. 5, cams 151–153 are provided on the underside of the original carriage 3. The cam 151 actuates microswitch MS14 to detect a position of the original carriage corresponding to the original thereon. More specifically, when the original carriage is in the shown position for sheet originals, the cam 151 opens the change-over microswitch MS14-a in the book original control circuit of the circuitry shown in FIG. 32. The cam 152 actuates microswitch MS12 to stop the original carriage 3 at a predetermined position. The cam 153 actuates microswitch MS10 for originals of A4 or smaller size, and actuates microswitch MS11 for originals of A3 size, thereby providing a signal for moving the original carriage in reverse direction.

Figure 32:
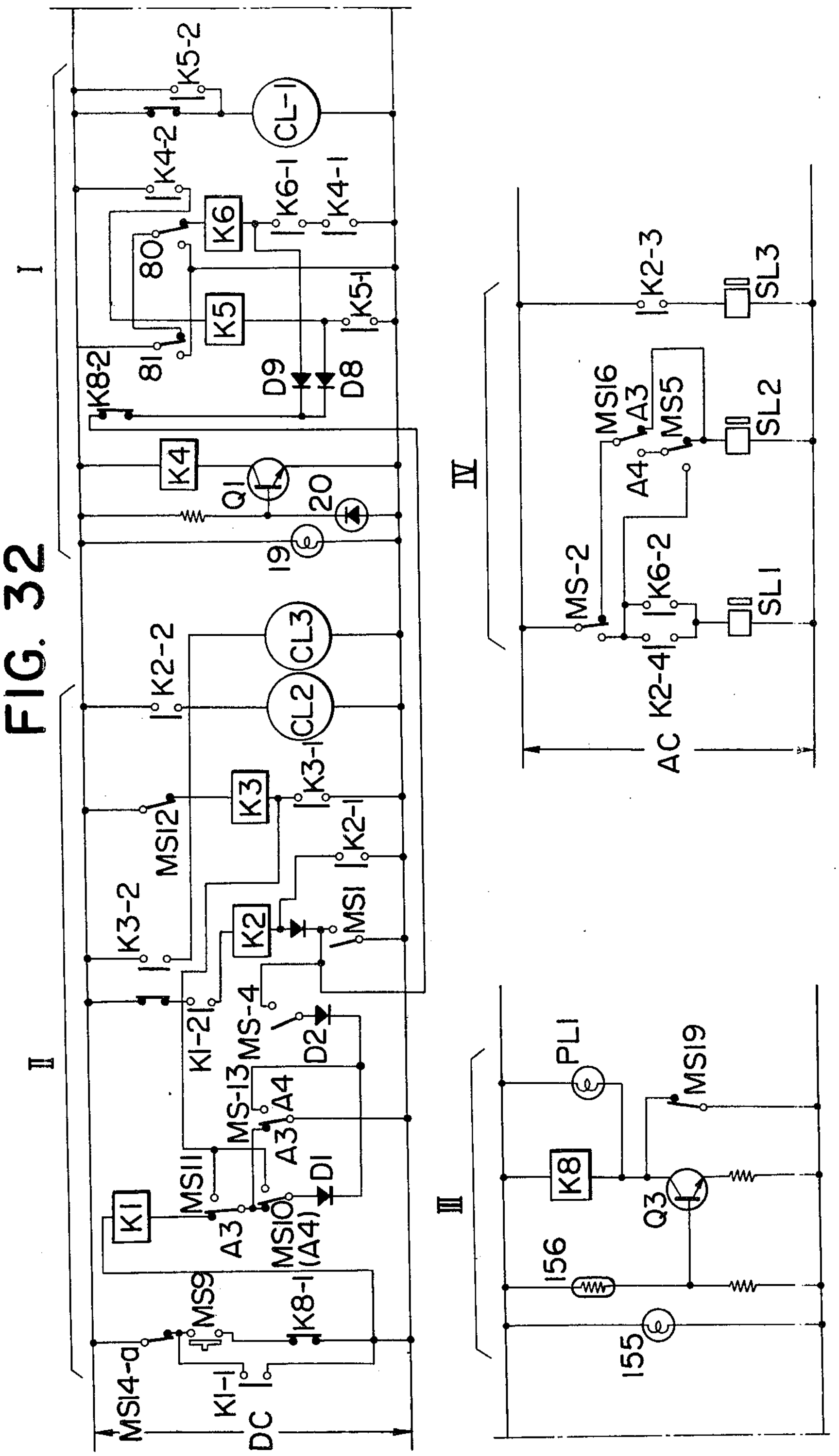
FIG. 32 is a diagram of the electric circuit for controlling the operation of the copying apparatus according to an embodiment of the present invention.

The electric control circuit arrangement for controlling various parts of the copying apparatus will be described with reference to FIG. 32.

I. Sheet Originals

Before a sheet original is transported to the sheet original transport means 2 on the original carriage 3, the light receiving element 20 forming the original detecting photoelectric means 19, 20 will produce an electromotive force, and transistor Q1 and accordingly original detecting relay K4 will be in OFF state. Through the normally closed contact K4-2 of the relay K4, electromagnetic clutch CL1 will be energized to drive gear 89 which in turn will drive original transport roll $18_1$.

When a sheet original is transported by rolls $18_1$, $18_2$ and the leading edge thereof reaches the detector means 19, 20, transistor Q1 and relay K4 will assume ON state and the normally closed contact K4-2 of the relay K4 will be opened to deenergize clutch CL1, thus stopping the original temporarily.

When the cam 157 of rotating drum gear 77 closes original start microswitch MS1 (FIG. 3), relay K5 will be energized through a circuit of K4-2 - K5 - D8 - K8-2 - MS1, and self-hold with the aid of contact K5-1, so that clutch CL1 will be energized through contact K5-2, thus starting transportation of the sheet original.

At the same time, a cassette when inserted will intercept the light to photoelectric means 155, 156 so that transistor Q3, cassette insertion signal microswitch MS19 and paper stock deficiency indicator lamp PL1 will all be in OFF state, and thus normally closed contact K8-2 remains closed.

Where the transfer paper P in the cassette 6 is of size A3, microswitch MS13 closes its contact A3 and microswitch MS16 is open. When the drum 17 is further rotated to actuate a subsequent original start microswitch MS4, no response will occur for an original of size A3 but, if the original is of A4 or smaller size, relay K5 will again energize clutch CL1 through a circuit of K4-2 - K5 - D8 - K8-2 - MS4 - D2 - MS13-A4, whereby a second sheet original of size A4 will begin to be transported during one rotation of the drum 17.

On the other hand, relay K6 is energized through a circuit of K8-2 - D7 - K6 - normally closed contacts of MS80, 81, and self-holds with the aid of K6-1 and K4-1. Rotation of the photosensitive drum 17 causes cam 157 to actuate paper feed microswitches MS2 and MS5. Where the original is of size A3, microswitch MS2 will deenergize the normally energized solenoid SL2 and make a circuit of K6-2 - SL1, thereby controlling the paper feed rolls 46 $47_1$ of FIG. 1 to feed a sheet of transfer paper. Where the original is of A4 or smaller size, solenoids SL1 and SL2 will be changed over irrespective of the open or closed position of MS16-A4 - MS5, thus feeding two sheets of transfer paper for each one rotation of the drum 17.

In the illustrated circuitry, microswitches MS80, 81 are adapted to be actuated by the cam 159 of drum gear 77 so that their normally closed contacts may hold the relay K6 in ON state, and in addition, these switches serve to produce a jam detection signal.

Figure 33:
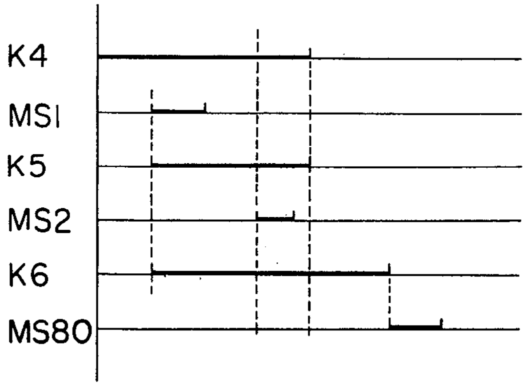
FIG. 33 is a time chart for the various switches in the same circuit.

When the interval between successive sheet originals is nearly equal to the spacing between rolls 18 and 21, it will be seen from the time chart of FIG. 33 that the contacts K4 and K5 are operative at a shorter interval than the microswitch MS2. Therefore, when the contact K4 (instead of K6) is used, the solenoid SL1 will not be energized even if a sheet original has properly passed the rolls 18 and 21, thus failing to effect paper feed. For this reason, use is made of relay K6 which may be operated for a predetermined time irrespective of the length of originals, with the aid of microswitches MS80, 81 provided on the drum 17 so as to be actuated later than the microswitch MS2.

II. BOOK ORIGINALS

When the original carriage 3 is displaced until the leading edge thereof reaches the detecting station (corresponding to the position assumed by photoelectric means 19, 20 during the sheet original copying operation), as described above, connectors 149, 150 will be disconnected and the position detector cam 151 on the underside of the original carriage will actuate microswitch MS14 to close its book original contact MS14-a.

When copy start button 14' is depressed, microswitch MS9 will be closed to make a circuit of MS14-a - MS9 - K8-1 - K1 - MS11-a3 - MS13-A3, through which the relay K1 will be energized and self-hold with the aid of its contact K1-1.

The cam 157 on the drum gear 77 will close the original start switch MS1 to make a circuit of K3-2NC - K1-2 - K2 - MS1, through which relay K2 for forwardly driving the original carriage will be energized and self-hold with the aid of its contact K2-1. Contact K2-3 will be closed to energize the solenoid SL3, so that the engagement between roll 63 and groove 66 will be released to unlock the carriage 3.

Closing of contact K2-2 will energize the clutch CL2 to move the carriage 3 forwardly. Cam 153 will actuate microswitch MS10 (for reversing the carriage movement in case of size A4) or microswitch MS11 (for reversing the carriage movement in case of size A3) which is located in the path of the carriage, whereby relay K1 and accordingly relay K2 will be deenergized to disengage clutch CL2, thus stopping the carriage 3.

The reversing contact of the microswitch MS10 or MS11 will energize relay K3 for reversely driving the original carriage, to thereby make a circuit of MS12 - K3 - MS10-A3 - D1 - MS13-A4 or MS12 - K3 - MS11-A4 - MS13-A3, and the relay K3 will self-hold with the aid of its contact K3-1. Through the contact K3-2 of this relay, the solenoid SL3 will be energized to drive the carriage 3 in the opposite direction. When the carriage 3 returns to a predetermined position (i.e. when the leading edge $67_1$ of the carriage reaches the detecting position), cam 152 will actuate microswitch MS12 to open this switch and accordingly deenergize relay K4 and clutch CL3, thus stopping the carriage 3 at this position.

Start button 14' may be again depressed to repeat the above-described operation, or alternatively the apparatus will be automatically operated in response to counter means 14.

Thus, according to the present invention, the electrophotographic copying apparatus using the drum type image transfer system can be simply and readily changed over between the sheet original copying mode and the book original copying mode without requiring the cumbersome detachment and reassemblage of the attachments. Moreover, the detection of the sheet original's position and the detection of the carriage's position during the book original copying mode take place at the same position and this enables the use of a common start signal from the photosensitive drum to simplify the control of the starting operation. During the sheet original copying mode, if the originals are of the size which permits two copies to be produced per full rotation of the photosensitive drum, the transportation of such originals and the feeding of copy or transfer sheets may take place in synchronism with each other to thereby enhance the efficiency of the copying operation.

Throughout the specification, the detection of the sheet original's position and the detection of the book original carriage's position have been described as taking place at the same position, but actually it is desirable that the stop position for the original carriage should be set to a position slightly more distant from the illuminating means 22 than the stop position for sheet originals, in view of the fact that the possible difference in inertia or the possible difference in the time required for stabilization of movement may occur between the sheet original and the original carriage when they are started to move by a common signal. Such an additional distance for the original carriage's stop position must be determined within a range which will in no way affect the start signal from the drum and the operation sequence of the various microswitches, and furthermore, the paper feed microswitches MS2 and MS5 must be used exclusively for the sheet original copying mode while additional two microswitches must be provided for use in the book original copying mode or alternatively, the copy paper feed signal must be produced in accordance with the movement of the original carriage.

We claim:

1. A counting device comprising:

a click wheel operative integrally with a dial for setting a number of repetitive operations to be performed, said click wheel having teeth therearound the number of which corresponds to the number of repetitive operations;

a ratchet wheel having a projection thereon, said ratchet wheel being rotated to a starting position thereof by rotation of said click wheel;

a start button, integrally formed with a center shaft and a rotation preventing member, for actuation to start said repetitive operations;

a feeding pawl for feeding said ratchet wheel in response to an external signal for every operation; and means for preventing said ratchet wheel from returning in a reverse direction, wherein said rotation preventing member is engageable with said preventing means, and wherein said preventing means includes means for locking said start button in its said actuated position, said preventing means being releasable in response to engagement by said ratchet wheel projection to thereby release said start button upon completion of the set number of repetitive operations.

2. A counting device according to claim 1, further comprising an emergency stop button for resetting both said stop button and said preventing means.

* * * * *

UNITED STATES PATENT AND TRADEMARK OFFICE
CERTIFICATE OF CORRECTION

PATENT NO. : 4,088,872

DATED : May 9, 1978

INVENTOR(S) : SHIGEHIRO KOMORI, ET AL.

It is certified that error appears in the above-identified patent and that said Letters Patent are hereby corrected as shown below:

Column 1, line 41, delete "cover", second occurrence;
Column 6, line 66, change "copies" to --copied--;
Column 12, line 27, change "dounted" to --mounted--;
Column 15, line 66, change "lke" to --like--;
Column 19, line 63, change "tun" to --turn--;
Column 25, line 11, after "heater" insert --58--;
Column 32, line 25, insert a comma after "46";
Column 32, line 50, change "BOOK ORIGINALS" to --Book Originals--.

Signed and Sealed this

*Twelfth* Day of *December 1978*

[SEAL]

*Attest:*

RUTH C. MASON
*Attesting Officer*

DONALD W. BANNER
*Commissioner of Patents and Trademarks*